(12) United States Patent
Kimata

(10) Patent No.: US 9,262,219 B2
(45) Date of Patent: Feb. 16, 2016

(54) DISTRIBUTED PROCESSING SYSTEM, DISTRIBUTED PROCESSING METHOD, AND DISTRIBUTED PROCESSING PROGRAM

(71) Applicant: Isao Kimata, Tokyo (JP)

(72) Inventor: Isao Kimata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 361 days.

(21) Appl. No.: 13/837,672

(22) Filed: Mar. 15, 2013

(65) Prior Publication Data

US 2013/0275992 A1    Oct. 17, 2013

(30) Foreign Application Priority Data

Mar. 26, 2012    (JP) .................................. 2012-69399

(51) Int. Cl.
*G06F 9/46* (2006.01)
*G06F 9/50* (2006.01)
*G06F 17/30* (2006.01)

(52) U.S. Cl.
CPC ........ *G06F 9/5005* (2013.01); *G06F 17/30545* (2013.01)

(58) Field of Classification Search
CPC .......................... G06F 9/5005; G06F 17/30545
See application file for complete search history.

(56) References Cited

U.S. PATENT DOCUMENTS

| | | | | |
|---|---|---|---|---|
| 6,848,106 | B1 * | 1/2005 | Hipp .............................. | 719/312 |
| 7,103,625 | B1 * | 9/2006 | Hipp et al. .................... | 709/201 |
| 7,526,534 | B2 * | 4/2009 | Henseler ....................... | 709/220 |
| 7,694,328 | B2 * | 4/2010 | Joshi et al. ........................ | 726/2 |
| 8,010,559 | B2 * | 8/2011 | Verma et al. .................. | 707/782 |
| 8,341,631 | B2 * | 12/2012 | Havemose ..................... | 718/100 |
| 2010/0125844 | A1 * | 5/2010 | Mousseau et al. ................ | 718/1 |
| 2010/0262970 | A1 * | 10/2010 | Havemose .................... | 718/104 |

FOREIGN PATENT DOCUMENTS

| | | | |
|---|---|---|---|
| JP | H09-073381 | A | 3/1997 |
| JP | 2003-202996 | A | 7/2003 |
| JP | 2004102449 | A | 4/2004 |
| JP | 2011-040044 | A | 2/2011 |
| JP | 2011-081652 | A | 4/2011 |
| JP | 2011-113397 | A | 6/2011 |

OTHER PUBLICATIONS

Japanese Office Action for JP Application No. 2012-069399 mailed on Sep. 29, 2015 with English Translation.

* cited by examiner

*Primary Examiner* — Van Nguyen

(57) ABSTRACT

The present invention includes application execution units (1*a*) and (1*b*) that perform distributed execution of one application while referencing a processing target file F in a distributed shared storage DS; a processing step monitoring unit (3) that monitors the processing step of the application that is being executed by the application execution units; a resource isolation determination unit (4) that determines whether the processing step being monitored by the processing step monitoring unit is a resource isolation step that requires resource isolation; and resource provision units (2)*a* and (2*b*) that generate an isolated file CF if the resource isolation determination unit determined that the processing step is the resource isolation step.

20 Claims, 21 Drawing Sheets

FIG. 2

| File F | | |
|---|---|---|
| Record number | Date | Value |
| 1 | 2011/6/14 | 10 |
| 2 | 2011/6/15 | 20 |
| 3 | 2011/6/16 | 10 |
| 4 | 2011/26/14 | 20 |
| 5 | 2011/6/4 | 50 |
| 6 | 2011/6/1 | 10 |
| 7 | 2011/6/11 | 1 |
| 8 | 2011/5/14 | 0 |
| 9 | 2011/6/10 | 100 |
| 10 | 2011/6/10 | 2 |

FIG. 14

| File F |
|---|
| URL |
| http://example.com/data/WEST/OSAKA |
| http://example.com/data/WEST/FUKUOKA |
| http://example.com/data/WEST/KOBE |
| http://example.com/data/WEST/KYOTO |
| http://example.com/data/EAST/TOKYO |
| http://example.com/data/EAST/YOKOHAMA |
| http://example.com/data/EAST/SENDAI |
| http://example.com/data/EAST/SAPPORO |

FIG. 15

| File F | |
|---|---|
| URL | Acquisition result |
| http://example.com/data/WEST/OSAKA | 100 |
| http://example.com/data/WEST/FUKUOKA | 200 |
| http://example.com/data/WEST/KOBE | 10 |
| http://example.com/data/WEST/KYOTO | 5 |
| http://example.com/data/EAST/TOKYO | Error |
| http://example.com/data/EAST/YOKOHAMA | 150 |
| http://example.com/data/EAST/SENDAI | 80 |
| http://example.com/data/EAST/SAPPORO | 90 |

DISTRIBUTED PROCESSING SYSTEM, DISTRIBUTED PROCESSING METHOD, AND DISTRIBUTED PROCESSING PROGRAM

CROSS-REFERENCE TO RELATED APPLICATION

This application is based upon and claims the benefit of priority from Japanese patent application No. 2012-069399, filed on Mar. 26, 2012, the disclosure of which is incorporated herein in its entirety by reference.

BACKGROUND OF THE INVENTION

1. Field of the Invention

The present invention relates to a distributed processing apparatus, a distributed processing method, and a computer-readable recording medium having recorded thereon a program for realizing the apparatus and method.

2. Description of Related Art

When executing batch processing, a greater amount of data can be processed by using a distributed execution environment in which multiple processes can be executed in parallel using distributed resources. For example, JP 2004-102449A discloses a system in which a distributed execution environment is used, and batch processing is executed while transferring data between multiple jobs.

However, since batch processing is non-interactive processing, there is the characteristic that when an error or obstacle has occurred in batch processing, a time lag occurs before information regarding the error or obstacle reaches the user. This time lag increases when using a distributed execution environment. For this reason, importance has been placed on developing technology for facilitating the tasks of analysis and response when an error or obstacle has occurred in batch processing.

Also, JP 2004-102449A makes no mention of processing to be executed when an error or obstacle has occurred. Accordingly, even when using the system disclosed in JP 2004-102449A, time is required for the tasks of analysis and response when an error or obstacle has occurred.

SUMMARY OF THE INVENTION

One example of an object of the present invention is to provide a distributed processing apparatus, a distributed processing method, and a computer-readable recording medium that, in order to resolve the above-described problems, are able to facilitate the tasks of analysis and response when an error or obstacle has occurred.

A distributed processing system according to an aspect of the present invention includes: a plurality of application execution units that perform distributed execution of one application while referencing a processing target file in a distributed shared storage;

a processing step monitoring unit that monitors a processing step of the application that is being executed by the application execution units;

a resource isolation determination unit that determines whether the processing step being monitored by the processing step monitoring unit is a resource isolation step that requires resource isolation; and a resource provision unit that, if the resource isolation determination unit determined that the processing step is the resource isolation step, generates an isolated file that corresponds to the processing target file.

A distributed processing method according to an aspect of the present invention includes: (a) a processing step monitoring step of, if a plurality of nodes are performing distributed execution of one application while referencing a processing target file in a distributed shared storage, monitoring a processing step of the application that is being executed;

(b) a resource isolation determination step of determining whether the processing step being monitored in the processing step monitoring step is a resource isolation step that requires resource isolation; and (c) a resource provision step of, if it was determined in the resource isolation determination step that the processing step is the resource isolation step, generating an isolated file that corresponds to the processing target file.

A first computer-readable recording medium according to an aspect of the present invention has recorded thereon a program containing instructions for causing a computer to execute:

(a) a processing step monitoring step of, if a plurality of nodes are performing distributed execution of one application while referencing a processing target file in a distributed shared storage, monitoring a processing step of the application that is being executed;

(b) a resource isolation determination step of determining whether the processing step being monitored in the processing step monitoring step is a resource isolation step that requires resource isolation; and (c) a resource provision step of, if it was determined in the resource isolation determination step that the processing step is the resource isolation step, generating an isolated file that corresponds to the processing target file.

A second computer-readable recording medium according to an aspect of the present invention has recorded thereon a program containing instructions for causing a computer to execute:

a step of, in a case where a plurality of nodes are performing distributed execution of one application while referencing a processing target file in a distributed shared storage, generating an isolated file that corresponds to the processing target file if a processing step of the application that is being executed corresponds to a resource isolation step that requires resource isolation.

A third computer-readable recording medium according to an aspect of the present invention has recorded thereon a program containing instructions for causing a computer to execute:

(a) a processing step monitoring step of, if a plurality of nodes are performing distributed execution of one application while referencing a processing target file in a distributed shared storage, monitoring a processing step of the application that is being executed; and (b) a resource isolation determination step of determining whether the processing step being monitored in the processing step monitoring step is a resource isolation step that requires resource isolation.

According to the present invention, it is possible to facilitate the tasks of analysis and response when an error or an obstacle has occurred.

BRIEF DESCRIPTION OF THE DRAWINGS

FIG. 2 is a diagram showing an example of a data configuration of a file stored in a distributed shared storage according to the first embodiment;

FIG. 14 is a diagram showing an example of a data configuration of a processing target file stored in a distributed shared storage according to the second embodiment;

FIG. 15 is a diagram showing an example of a result of data acquisition from URLs specified by the processing target file shown in FIG. 14;

EXEMPLARY EMBODIMENT

Hereinafter, a distributed processing system, a distributed processing method, and a distributed processing program according to preferred embodiments of the present invention will be described with reference to the accompanying drawings.

First Embodiment

System Configuration

Figure 1:
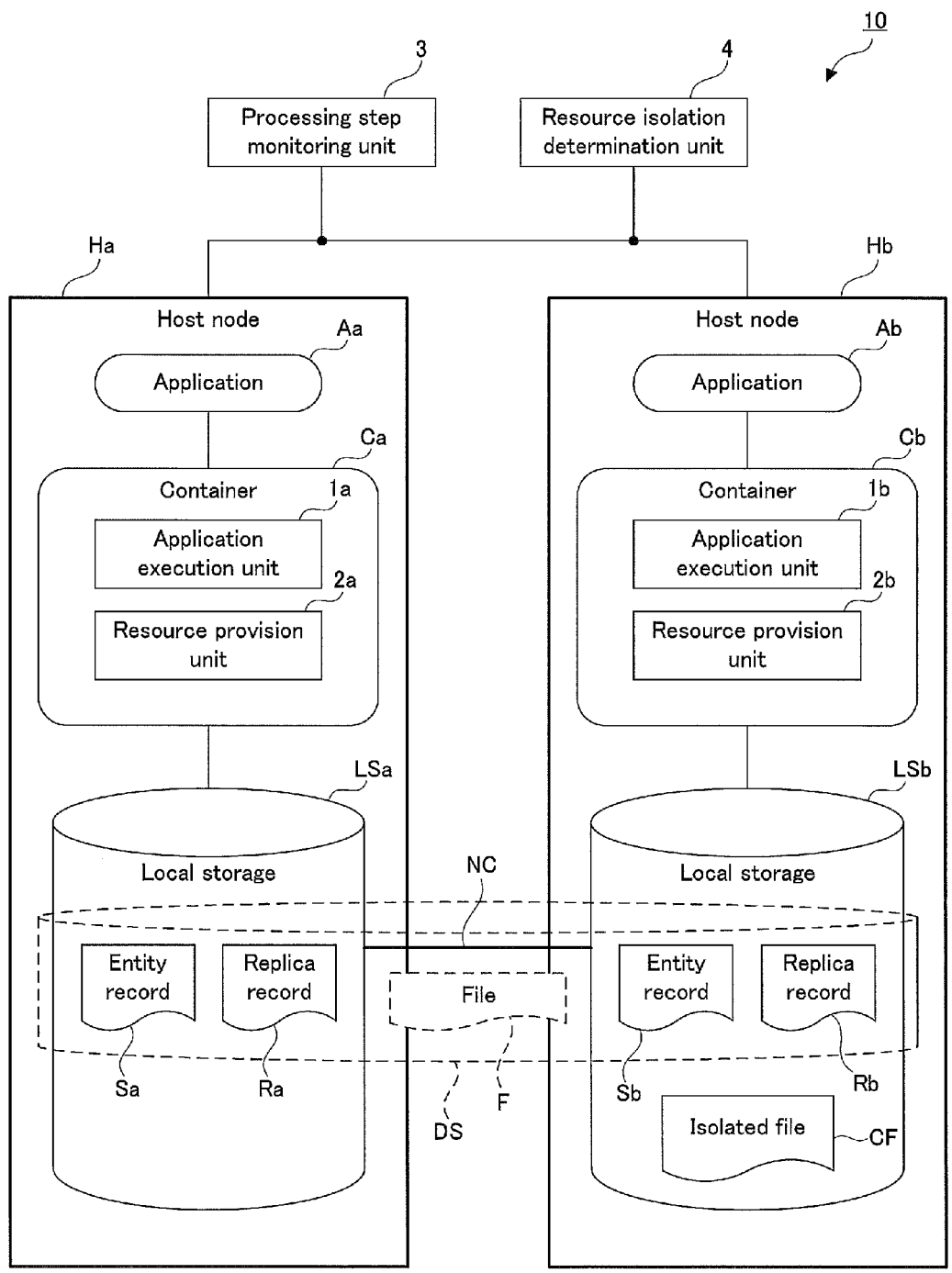
FIG. 1 is a block diagram showing an example of a configuration of a distributed processing system according to a first embodiment.

First, the configuration of a distributed processing system according to a first embodiment will be described with reference to FIG. 1. FIG. 1 is a block diagram showing an example of the configuration of the distributed processing system according to the first embodiment.

As shown in FIG. 1, a distributed processing system 10 of the first embodiment includes application execution units 1a and 1b, a processing step monitoring unit 3, a resource isolation determination unit 4, and resource provision units 2a and 2b.

Among these, the application execution units 1a and 1b perform distributed execution of a single application while referencing a processing target file F in a distributed shared storage DS.

Also, the processing step monitoring unit 3 monitors the processing step of the application being executed by the application execution units 1a and 1b. The resource isolation determination unit 4 determines whether the processing step being monitored by the processing step monitoring unit 3 is a resource isolation step that requires resource isolation.

The resource provision units 2a and 2b generate an isolated file CF as a substitute for the processing target file F if the resource isolation determination unit 4 has determined that the processing step is a resource isolation step.

In this way, with the distributed processing system 10, if an error or an obstacle has occurred, the isolated file CF is generated as a substitute for the processing target file F, thus facilitating the tasks of analysis and response.

The following is a more detailed description of the configuration of the distributed processing system 10. In the first embodiment, the distributed processing system 10 includes two host nodes Ha and Hb and management nodes 5, which are connected to each other via a network. The nodes may be physical nodes or virtual nodes.

As shown in FIG. 1, the processing step monitoring unit 3 and the resource isolation determination unit 4 are included in management nodes 5 that are different from the host nodes Ha and Hb. Note that there may be two management nodes, and in this case, the processing step monitoring unit 3 and the resource isolation determination unit 4 are included in different nodes.

Also, as shown in FIG. 1, in the distributed processing system 10, a distributed shared storage DS is formed by the two host nodes Ha and Hb, and the host nodes Ha and Hb respectively execute applications Aa and Ab, which are the same application.

Furthermore, the host node Ha includes a container Ca and a local storage LSa. The host node Hb similarly includes a container Cb and a local storage LSb. The container Ca includes the application execution unit 1a and the resource provision unit 2a. The container Cb includes the application execution unit 1b and the resource provision unit 2b. The local storage LSa and the local storage LSb are connected to each other via a network connection NC, and the distributed shared storage DS is constructed by the local storages LSa and LSb.

Note that the host nodes Ha and Hb, the containers Ca and Cb, the applications Aa and Ab, the application execution units 1a and 1b, the resource provision units 2a and 2b, and the local storages LSa and LSb will hereinafter be respectively referred to as the host node H, the container C, the application A, the application execution unit 1, the resource provision unit 2, and the local storage LS when there is no particular need to distinguish between them.

In general, in a distributed processing system that uses a distributed shared storage, data of a single file is divided, and nodes are selected so as to ensure consistency and persistence for the various divided data segments. The propagation of operations such as the holding, referencing, and updating of reference cache data is performed between the nodes, and communication for maintaining consistency is performed between the nodes. Various types of known techniques can be used for protocols of the node selection, reference, and update for each distributed shared storage that is implemented.

The following describes the functions of the application execution unit in the case of using the file shown in FIG. 2 as the file F in the distributed shared storage DS. FIG. 2 is a diagram showing an example of the data configuration of a file stored in the distributed shared storage according to the first embodiment.

In the first embodiment, the file shown in FIG. 2 is divided into two sections in units of records. The five records in the first half are stored as entity records Sa in the local storage LSa of the host node Ha, and the five records in the last half are stored as entity records Sb in the local storage LSb of the host node Hb.

In the first embodiment, the application execution unit 1 receives a parameter from the application A when the processing thereof starts. If the parameter is "1", the application execution unit 1 sets the odd-numbered records of the file F in the distributed shared storage DS as the processing targets of the application A, and if the parameter is "2", the application execution unit 1 sets the even-numbered records of the file F in the distributed shared storage DS as the processing targets of the application A.

For example, when the application Aa executed by the application execution unit 1a makes a reference request for the five records in the last half of the file F, a reference request is sent from the local storage LSa to the local storage LSb via the network connection NC. Reference replica records Ra corresponding to the five records in the last half are then cached in the local storage LSa. In this case, the application Aa references the data of the reference replica records Ra.

When the application Aa makes an update request for the five records in the last half of the file F, an update request is sent from the local storage LSa to the local storage LSb via the network connection NC. The reference replica records Ra in the local storage LSa are then updated, and the local storage LSb ensures consistency and persistence for the entity records Sb when the update is performed.

On the other hand, when the application Ab makes a reference request for the five records in the first half of the file F, a reference request is sent from the local storage LSb to the local storage LSa via the network connection NC. Reference replica records Rb corresponding to the five records in the first half are then cached in the local storage LSb. In this case, the application Ab references the data of the reference replica records Rb.

When the application Ab makes an update request for the five records in the first half of the file F, an update request is sent from the local storage LSb to the local storage LSa via the network connection NC. The reference replica records Rb in the local storage LSb are then updated, and the local storage LSa ensures consistency and persistence for the entity records Sa when the update is performed.

Next, the functions of the resource provision unit 2, the processing step monitoring unit 3, and the resource isolation determination unit 4 will be described with reference to FIG. 1.

First, the application execution unit 1 executes the application A with reference to the processing target file F in the distributed shared storage DS.

The resource provision unit 2 executes reference processing for referencing data and update processing for updating data in accordance with a resource reference request and update request from the application execution unit 1.

The processing step monitoring unit 3 monitors the processing step of the application A that is currently being executed by the application execution unit 1. Accordingly, the resource provision unit 2 acquires, from the processing step monitoring unit 3, information for specifying the processing step of the application A that is currently being executed by the application execution unit 1.

The resource provision unit 2 specifies the processing step based on the information acquired from the processing step monitoring unit 3, and makes an inquiry to the resource isolation determination unit 4 regarding whether the specified processing step corresponds to a resource isolation target step.

Upon receiving the inquiry from the resource provision unit 2, the resource isolation determination unit 4 determines whether the processing step for which the inquiry was received is a resource isolation step that requires resource isolation.

Upon determining that the processing step is a resource isolation step, the resource isolation determination unit 4 notifies the resource provision unit 2 of that fact. Accordingly, the resource provision unit 2 generates an isolated file CF in the local storage LS of the host node H that is executing the resource isolation step, and duplicates the content of the processing target file F in the isolated file CF.

After the isolated file CF is generated in the local storage LS of the host node H that constructs the application execution unit 1, the application execution unit 1 executes the application A with reference to the isolated file CF.

System Operations

Next, operations performed in the distributed processing system 10 of the first embodiment will be described with reference to FIGS. 3 to 8. FIGS. 1 and 2 will be referenced as needed in the following description. Also, in the first embodiment, a distributed processing method is carried out by causing the distributed processing system 10 to operate. Accordingly, the following description of operations performed in the distributed processing system 10 will substitute for a description of a distributed processing method according to the first embodiment.

System Operations>Application Execution Unit>Overall Processing

Figure 3:
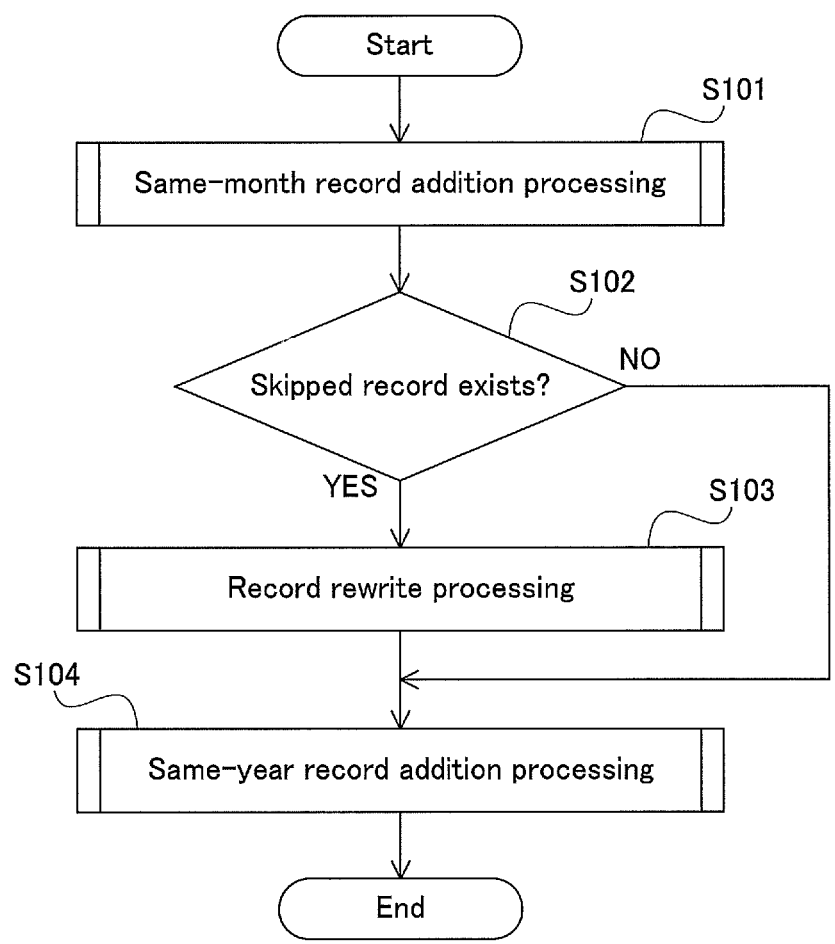
FIG. 3 is a flowchart showing processing steps of an application according to the first embodiment.

First, operations performed by the application execution unit 1, that is to say the processing steps of the application A of the first embodiment, will be described with reference to FIG. 3. FIG. 3 is a flowchart for describing processing steps of the application according to the first embodiment. In the first embodiment, the application A is a program whose main processing steps are a same-month record addition processing step, a record rewrite processing step, and a same-year record addition processing step. These processing steps are executed by the application execution unit 1 according to the following procedure.

As shown in FIG. 3, first, the application execution unit 1 executes the same-month record addition processing (step S101). Note that as will be described later, the file to be subjected to the same-month record addition processing is provided by the resource provision unit 2.

Next, the application execution unit 1 determines whether a record was skipped in the same-month record addition processing (step S102). In the case of a negative determination (NO in step S102), the application execution unit 1 moves to the later-described processing of step S104.

On the other hand, in the case of determining in the determination of step S102 that a record was skipped (YES in step S102), the application execution unit 1 executes record rewrite processing (step S103).

Next, the application execution unit 1 executes same-year record addition processing (step S104). After step S104 is executed, processing in the application execution unit 1 ends.

Figure 4:
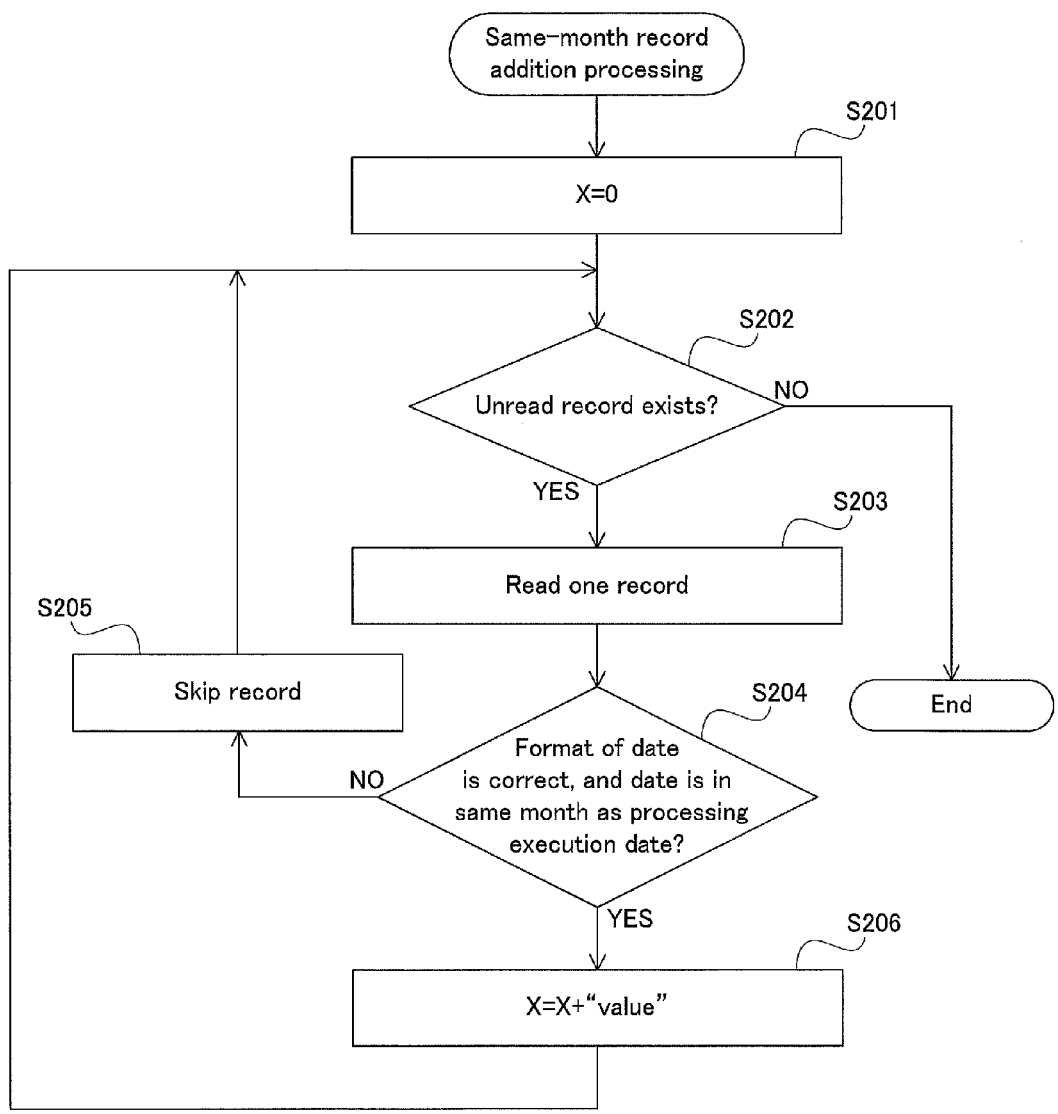
FIG. 4 is a flowchart showing details of same-month record addition processing shown in FIG. 3.

System Operations>Application Execution Unit>Same-Month Record Addition Processing Next, details of the same-month record addition processing in step S101 shown in FIG. 3 will be described with reference to FIG. 4. FIG. 4 is a flowchart showing details of the same-month record addition processing shown in FIG. 3.

As shown in FIG. 4, first, the application execution unit 1 initializes a variable X and sets its value to 0 (zero) (step S201).

Next, the application execution unit 1 checks whether the file F (see FIG. 2) has an unread record (step S202). If the result of the determination in step S202 is that the file F does not have an unread record (NO in step S202), the application execution unit 1 ends the same-month record addition processing.

On the other hand, if the result of the determination in step S202 is that the file F has an unread record (YES in step S202), the application execution unit 1 reads one record from the file F (step S203).

Next, the application execution unit 1 determines whether the format of the date of the record that was read in step S203 is correct, and that date is in the same month as the processing execution date (step S204). If the result of the determination in step S204 is a negative determination (NO in step S204), the read record is skipped (step S205). The application execution unit 1 then executes step S202 again.

On the other hand, if the result of the determination in step S204 is an affirmative determination, that is to say, if the format of the date of the record is correct, and that date is in the same month as the processing execution date (YES in step S204), the application execution unit 1 adds the value of the record that was read in step S203 to the variable X (step S206). The application execution unit 1 then executes step S202 again.

System Operations>Application Execution Unit>Record Rewrite Processing

Figure 5:
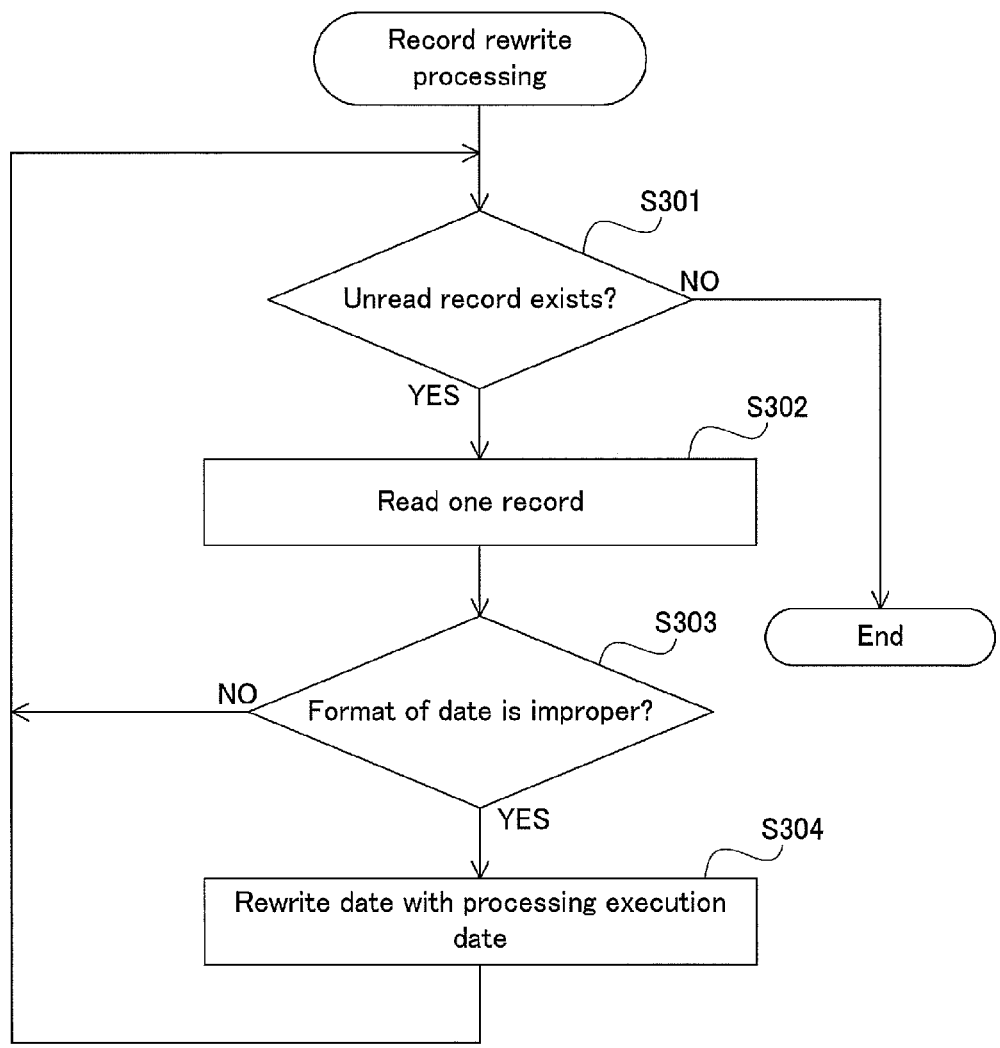
FIG. 5 is a flowchart showing details of record rewrite processing shown in FIG. 3.

Next, details of the record rewrite processing in step S103 shown in FIG. 3 will be described with reference to FIG. 5. FIG. 5 is a flowchart showing details of the record rewrite processing shown in FIG. 3.

As shown in FIG. 5, first, the application execution unit 1 checks whether the file F (see FIG. 2) has an unread record (step S301). If the result of the determination in step S301 is that the file F does not have an unread record (NO in step S301), the application execution unit 1 outputs the variable X and ends the record rewrite processing.

On the other hand, if the result of the determination in step S301 is that the file F has an unread record (YES in step S301), the application execution unit 1 reads one record from the file F (step S302).

Next, the application execution unit 1 determines whether the format of the date of the record that was read in step S302 is improper (step S303). If the result of the determination in step S303 is that the format of the date of the record is not improper (NO in step S303), the application execution unit 1 executes step S301 again.

On the other hand, if the result of the determination in step S303 is that the format of the date of the record is improper (YES in step S303), the application execution unit 1 updates the record that was read in step S302 by rewriting the date thereof with the processing execution date (step S304). The application execution unit 1 then executes step S301 again.

Figure 6:
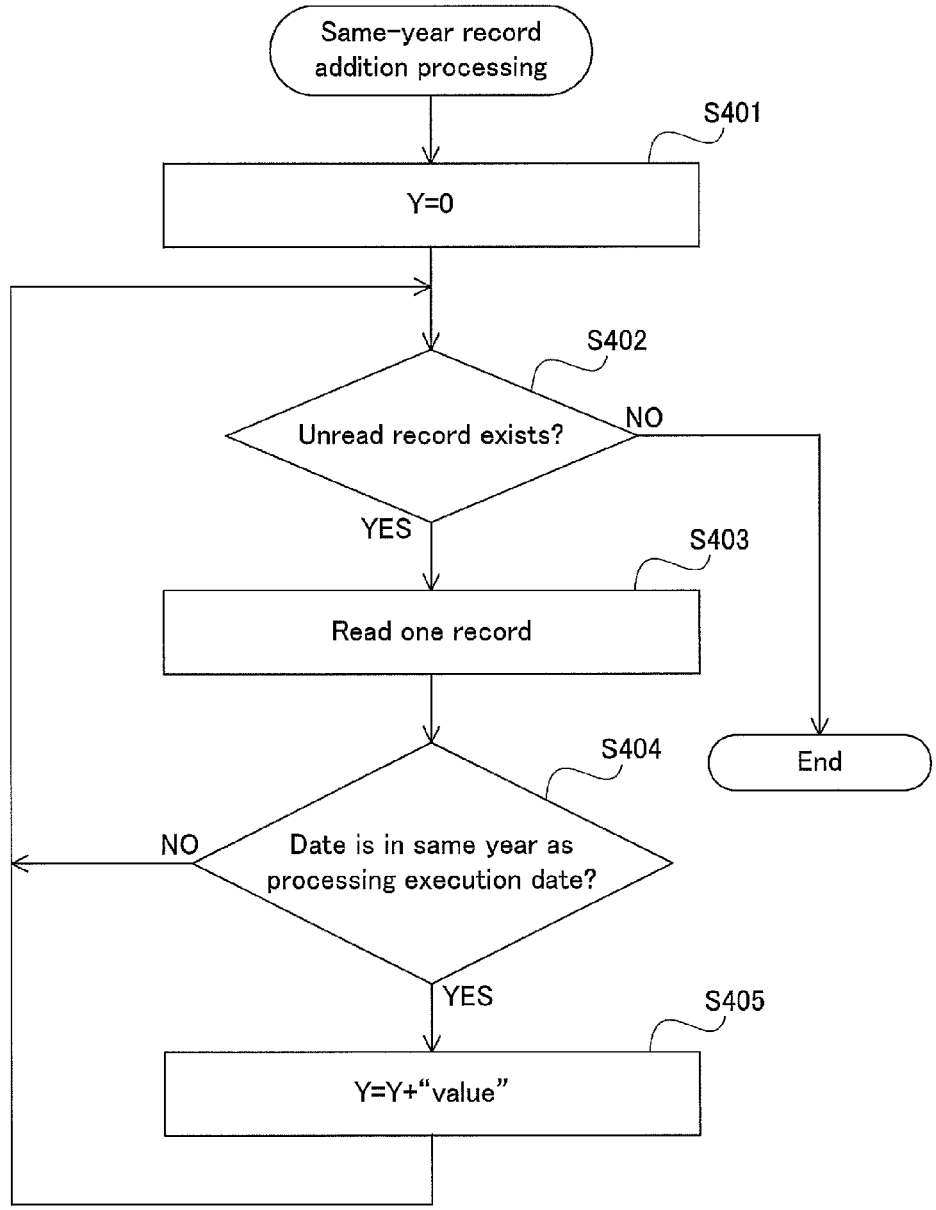
FIG. 6 is a flowchart showing details of same-year record addition processing shown in FIG. 3.

System Operations>Application Execution Unit>Same-Year Record Addition Processing Next, details of the same-year record addition processing in step S104 shown in FIG. 3 will be described with reference to FIG. 6. FIG. 6 is a flowchart showing details of the same-year record addition processing shown in FIG. 3.

As shown in FIG. 6, first, the application execution unit 1 initializes a variable Y and sets its value to 0 (zero) (step S401).

Next, the application execution unit 1 determines whether the file F has an unread record (step S402). If the result of the determination in step S402 is that the file F does not have an unread record (NO in step S402), the application execution unit 1 outputs the variable Y and ends the same-year record addition processing.

On the other hand, if the result of the determination in step S402 is that the file F has an unread record (YES in step S402), the application execution unit 1 reads one record from the file F (step S403).

Next, the application execution unit 1 determines whether the year of the date of the record that was read in step S403 is the same year as the year of the processing execution date (step S404). If the result of the determination in step S404 is that the year of the date of the record is not the same year as the year of the processing execution date (NO in step S404), the application execution unit 1 executes step S402 again.

On the other hand, if the result of the determination in step S404 is that the year of the date of the record is the same year as the year of the processing execution date (YES in step S404), the application execution unit 1 adds the "value" of the record that was read in step S403 to the variable Y (step S405). The application execution unit 1 then executes step S402 again.

System Operations>Resource Provision Unit

Figure 7:
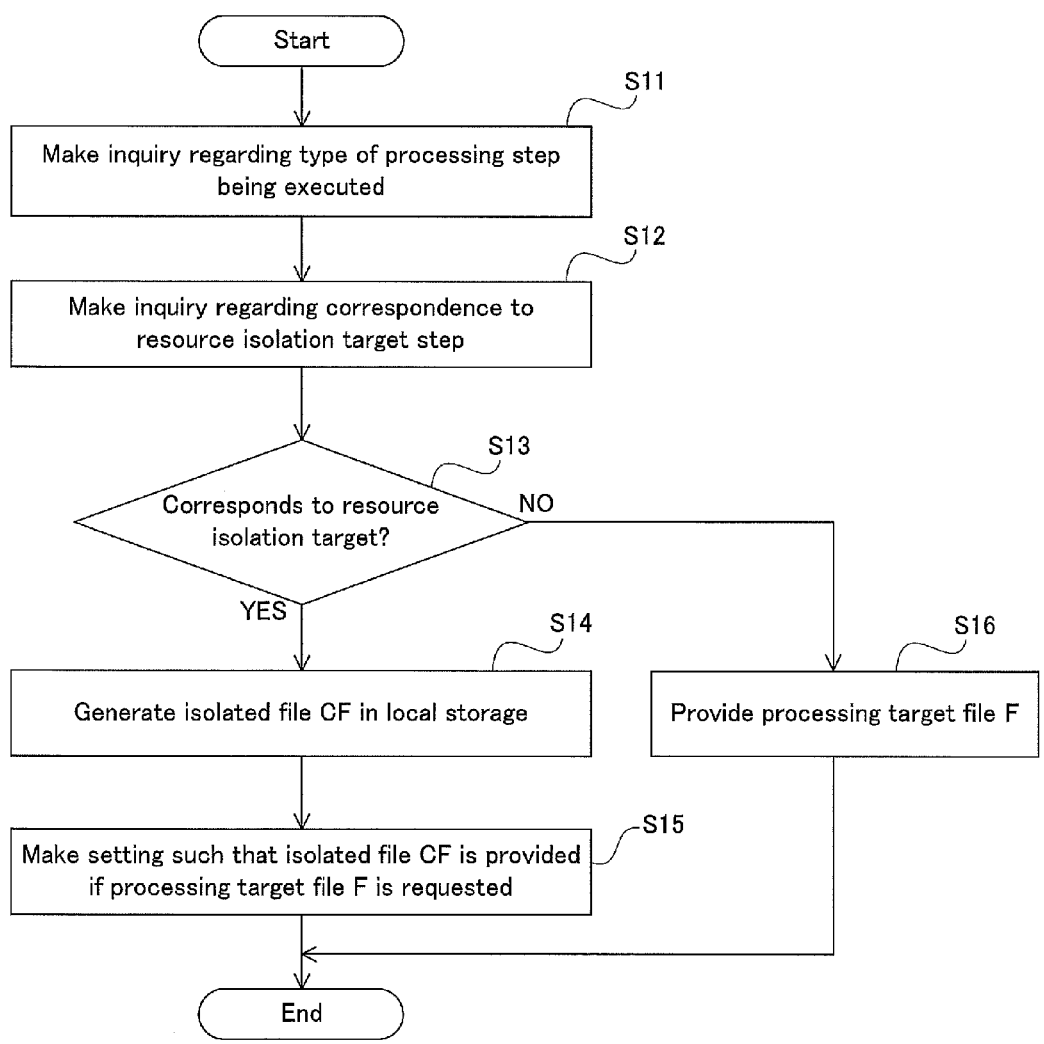
FIG. 7 is a flowchart showing resource provision processing according to the first embodiment.

Next, operations performed by the resource provision unit 2, that is to say resource provision processing, will be described with reference to FIG. 7. FIG. 7 is a flowchart showing resource provision processing according to the first embodiment.

As shown in FIG. 7, first, the resource provision unit 2 makes an inquiry to the processing step monitoring unit 3 in order to specify the processing step of the application A that is being executed by the application execution unit 1 in the same node (step S11).

Next, when an inquiry result is transmitted from the processing step monitoring unit 3 in response to the inquiry made in step S11, the resource provision unit 2 specifies the processing step based on the inquiry result. The resource provision unit 2 then makes an inquiry to the resource isolation determination unit 4 regarding whether the specified processing step corresponds to a resource isolation target step (step S12).

Next, when an inquiry result is transmitted from the resource isolation determination unit 4 in response to the inquiry made in step S12, the resource provision unit 2 determines based on the inquiry result whether the specified processing step is a resource isolation target step (step S13).

If the result of the determination in step S13 is that the specified processing step is not a resource isolation target step, the resource provision unit 2 provides the application execution unit 1 with the processing target file F in the distributed shared storage DS of the host node H (step S16).

On the other hand, if the result of the determination in step S13 is that the specified processing step is a resource isolation target step (specifically, is the record rewrite processing step), the resource provision unit 2 generates the isolated file CF in the local storage LS in the node in which the resource provision unit 2 is provided, and duplicates the content of the processing target file F in the isolated file CF (step S14).

Next, after the execution of step S14, the resource provision unit 2 changes its setting and thereafter provides the isolated file CF in the local storage LSb in response to a reference request for the processing target file F from the application execution unit 1b (step S15).

Figure 8:
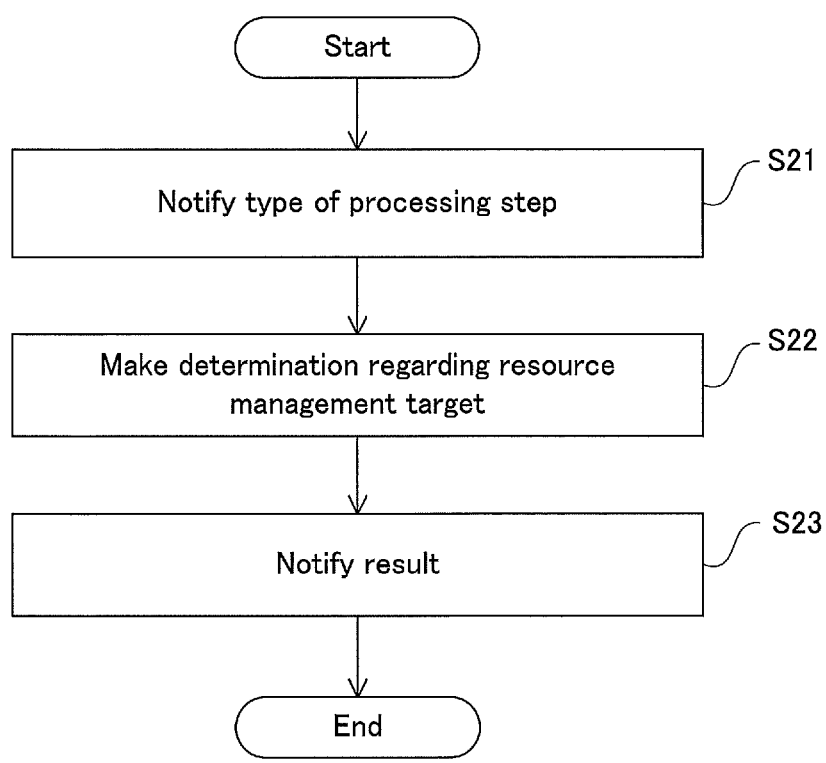
FIG. 8 is a flowchart showing monitoring processing and resource isolation determination processing according to the first embodiment.

System Operations>Processing Step Monitoring Unit, Resource Isolation Determination Unit Next, operations performed by the processing step monitoring unit 3 and resource isolation determination unit 4 will be described with reference to FIG. 8. FIG. 8 is a flowchart showing monitoring processing and resource isolation determination processing according to the first embodiment.

As shown in FIG. 8, first, the processing step monitoring unit 3 continues to monitor the processing step that is being executed by each application execution unit 1. If an inquiry regarding the type of the processing step of the application A being executed by the application execution unit 1 is received from the application execution unit 2, the processing step monitoring unit 3 notifies the type of the processing step as the inquiry result (step S21).

Next, upon receiving an inquiry from the resource provision unit 2 regarding whether the executed processing step corresponds to a resource isolation target step, the resource isolation determination unit 4 determines whether the processing step corresponds to a resource isolation target step (step S22).

The resource isolation determination unit 4 then transmits the result of the determination in step S22 to the resource provision unit 2 as the inquiry result (step S23).

System Operations>Specific Example

The following describes a specific example of operations in the case where the application execution unit 1a designates the parameter "1" and executes the application Aa, and the application execution unit 1b designates the parameter "2" and executes the application Ab in parallel.

In these operations, among the records shown in FIG. 2, the application execution unit 1a sets the records having the record numbers "1", "3", "5", "7", and "9" as the processing target records. On the other hand, among the records shown in FIG. 2, the application execution unit 1b sets the records having the record numbers "2", "4", "6", "8", and "10" as the processing target records. Also, the execution date of the application A is assumed to be "2011/6/16". Furthermore, the resource isolation determination unit 4 sets the record rewrite processing as a resource isolation target step.

The application Aa is executed according to the following procedure.

(a-1) The application execution unit 1a starts executing the same-month record addition processing on the records having the record numbers "1", "3", "5", "7", and "9".

(a-2) The resource provision unit 2a determines based on a notification from the processing step monitoring unit 3 that the processing step currently being executed by the application execution unit 1a is the same-month record addition processing.

(a-3) The resource provision unit 2a determines based on a notification from the resource isolation determination unit 4 that the same-month record addition processing does not correspond to a resource isolation target step.

(a-4) The resource provision unit 2a provides the application execution unit 1a with the processing target file F in the distributed shared storage DS.

(a-5) The application execution unit 1a executes the same-month record addition processing on the processing target file F that was provided, and outputs "171" as the result of the same-month record addition processing.

(a-6) Since no records were skipped in the same-month record addition processing, the application execution unit 1a sequentially executes the same-year record addition processing on the records having the record numbers "1", "3", "5", "7", and "9".

(a-7) The resource provision unit 2a determines based on a notification from the processing step monitoring unit 3 that the processing step currently being executed by the application execution unit 1a is the same-year record addition processing.

(a-8) The resource provision unit 2a determines based on a notification from the resource isolation determination unit 4 that the same-year record addition processing does not correspond to a resource isolation target step.

(a-9) The resource provision unit 2a provides the application execution unit 1a with the processing target file F in the distributed shared storage DS.

(a-10) The application execution unit 1a outputs "171" as the result of the same-year record addition processing.

The application Ab is executed according to the following procedure.

(b-1) The application execution unit 1b starts executing the same-month record addition processing on the records having the record numbers "2", "4", "6", "8", and "10".

(b-2) The resource provision unit 2b determines based on a notification from the processing step monitoring unit 3 that the processing step currently being executed by the application execution unit 1b is the same-month record addition processing.

(b-3) The resource provision unit 2b determines based on a notification from the resource isolation determination unit 4 that the same-month record addition processing does not correspond to a resource isolation target step.

(b-4) The resource provision unit 2b provides the application execution unit 1b with the processing target file F in the distributed shared storage DS.

(b-5) Since the format of the date of the record having the record number "4" is improper in the same-month record addition processing, the application execution unit 1b skips the record having the record number "4". Since the month of the date of the record having the record number "8" is different from the month of the execution date, the application execution unit 1b also skips the record having the record number "8". The application execution unit 1b outputs "32" as the result of the same-month record addition processing.

(b-6) Since a record was skipped in the same-month record addition processing, the application execution unit 1b sequentially executes the record rewrite processing on the records having the record numbers "2", "4", "6", "8", and "10".

(b-7) The resource provision unit 2b determines based on a notification from the processing step monitoring unit 3 that the processing step currently being executed by the application execution unit 1b is the record rewrite processing.

(b-8) The resource provision unit 2b determines based on a notification from the resource isolation determination unit 4 that the record rewrite processing corresponds to a resource isolation target step.

(b-9) The resource provision unit 2b generates the isolated file CF, which is a duplicate of the processing target file F in the distributed shared storage DS, in the local storage LSb.

(b-10) The resource provision unit 2b provides the application execution unit 1b with the isolated file CF in the local storage LSb. The resource provision unit 2b changes its setting such that thereafter the isolated file CF in the local storage LSb is provided in response to a reference request for the processing target file F from the application execution unit 1b.

(b-11) The application execution unit 1b rewrites the date of the record having the record number "4" with the execution date "2011/6/16" in the record rewrite processing. This rewriting is performed on only the record in the isolated file CF. Accordingly, the resources of the network connection NC and the local storage LSa are not used.

(b-12) The application execution unit $1b$ sequentially executes the same-year record addition processing on the records having the record numbers "2", "4", "6", "8", and "10".

(b-13) The resource provision unit $2b$ provides the application execution unit $1b$ with the isolated file CF in the local storage LSb.

(b-14) The application execution unit $1b$ outputs "52" as the result of the same-year record addition processing.

As described above, with the distributed processing system 10 of the first embodiment, the isolated file CF is generated in the local storage LS if the processing step is a resource isolation step.

For this reason, the system administrator can easily become aware of the fact that a resource isolation step was executed by checking for the existence of the isolated file. This makes it possible to facilitate the tasks of analysis and response when an error or an obstacle has occurred.

Also, the isolated file CF, which is obtained by copying the processing target file F, is generated in the local storage LS, not in the distributed shared storage DS. When a reference request for the processing target file F is then received from the application A, the application is provided with the isolated file CF.

Accordingly, the processing from the resource isolation step onward can be executed within the local storage LS without using the network connection NC, thus making it possible to suppress the usage of network resources in the system. Also, since competition for resources does not arise with the other host node H, the execution of the application A in the other host node is not hindered.

Also, in the above-described specific example, there is one container that processed the recovery of error records, and there are two host nodes overall, and therefore network usage is reduced by an amount corresponding to replica record updating being performed one time. Letting n be the number of error records, and m be the overall number of host nodes, an effect is that the number of times replica record updating is performed can be reduced by n×(m−1) times. In other words, in the case where 100 record errors occur uniformly in a distributed execution environment that uses 100 host nodes, communication for replica update processing can be reduced by up to an amount corresponding to performing communication 9900 times.

Distributed Processing Program

A first program according to the first embodiment needs only be a program for causing computers configuring the host nodes H to execute steps S11 to S15 shown in FIG. 7. The resource provision unit 2 can be constructed by installing this program in the computers and executing it. In this case, the central processing units (CPUs) of the computer function and perform processing as the resource provision unit 2.

Furthermore, a second program according to the first embodiment needs only be a program for causing computers configuring the management nodes 5 to execute steps S21 to S23 shown in FIG. 8. The processing step monitoring unit 3 and the resource isolation determination unit 4 can be constructed by installing this program in the computers and executing it. In this case, the central processing units (CPUs) of the computers function and perform processing as the processing step monitoring unit 3 and the resource isolation determination unit 4.

Second Embodiment

Next, a distributed processing system, a distributed processing method, and a distributed processing program according to a second embodiment of the present invention will be described with reference to FIGS. 9 to 19.

System Configuration

Figure 9:
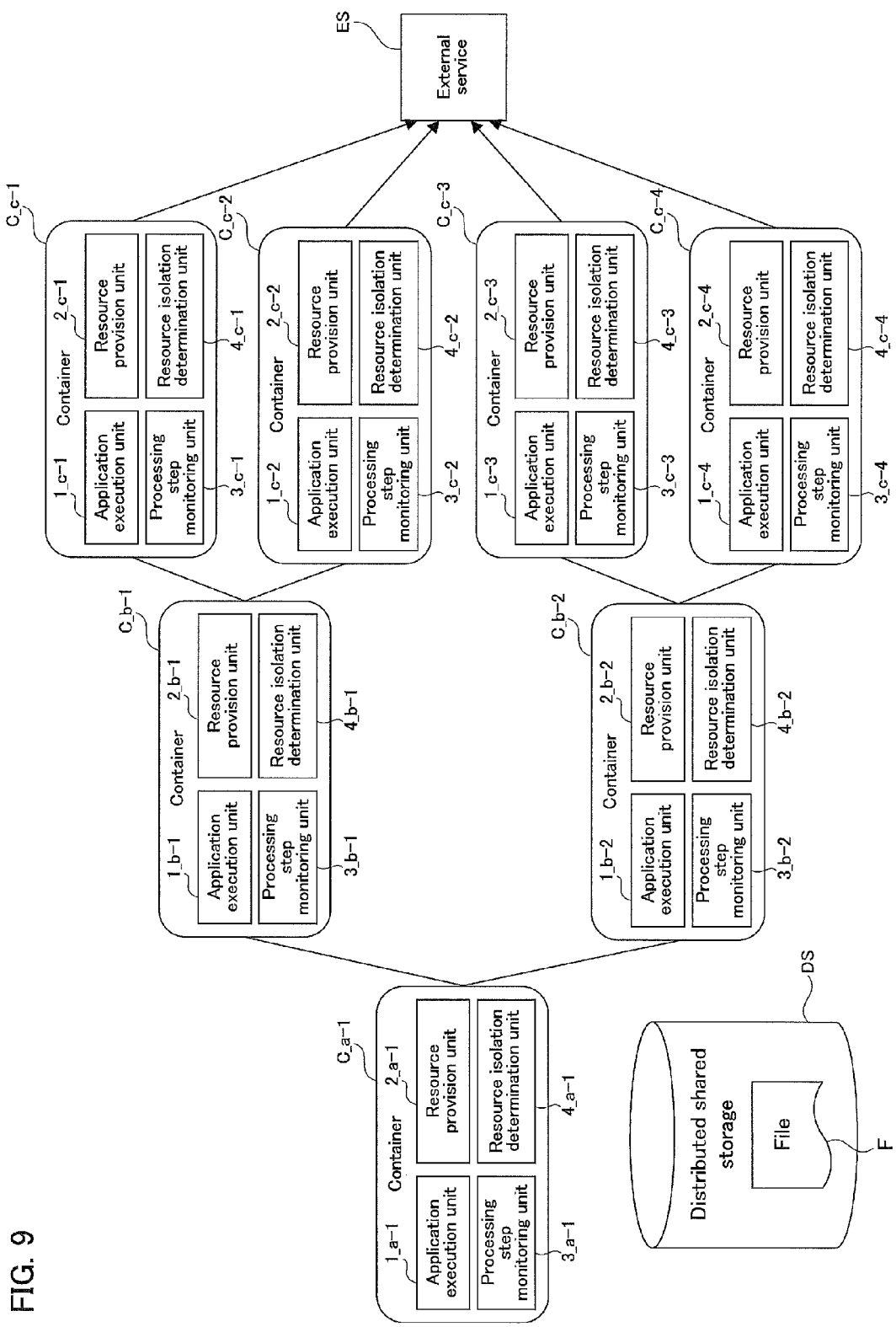
FIG. 9 is a block diagram showing an example of a configuration of a distributed processing system according to a second embodiment.

First, the configuration of a distributed processing system 20 according to the second embodiment will be described with reference to FIG. 9. In the second embodiment, an application A is executed in multiple containers C that form parent-child relationships. FIG. 9 is a block diagram showing an example of the configuration of the distributed processing system according to the second embodiment. Note that only main units of the distributed processing system are shown in FIG. 9.

In the second embodiment, each container C_<X>-<Y> shown in FIG. 9 forms two child containers C_<succ(X)>-<Y×2-1> and C_<succ(X)>-<Y×2>. Here, succ(X) refers the alphabet letter that follows the alphabet letter X. Specifically, succ("a") refers to "b", and succ("b") refers to "c". Accordingly, the container C_a-1 forms the two child containers C_b-1 and C_b-2, and the container C_b-1 forms the two child containers C_c-1 and C_c-2, for example.

As shown in FIG. 9, each container C includes an application execution unit 1, a resource provision unit 2, a processing step monitoring unit 3, and a resource isolation determination unit 4. In the second embodiment, these units have functions similar to those of the units in the above-described first embodiment, and also have functions unique to the second embodiment. The following describes mainly the functions that are unique to the second embodiment.

In the second embodiment, the resource provision unit 2 accesses an external service ES in addition to the distributed shared storage DS. Also, the processing step monitoring unit 3 and the resource isolation determination unit 4 are constructed in each container C.

The processing step monitoring unit 3 monitors the processing step of the application A in the container C in which it is constructed, and also references the processing step of the application A in containers that are in a parent-child relationship or a child-grandchild relationship.

The processing step monitoring unit 3 also monitors the processing step execution history in its own container C and the processing step execution history in the containers that are in a parent-child relationship or a child-grandchild relationship.

The resource provision unit 2 makes an inquiry to the resource isolation determination unit 4 regarding whether resource isolation is necessary, based on a processing step execution history obtained from the processing step monitoring unit 3.

The resource isolation determination unit 4 determines whether the processing step execution history includes a resource isolation target step. If the processing step execution history includes a resource isolation target step, the resource isolation determination unit 4 sends a response to the resource provision unit 2 indicating that resource isolation is necessary.

Upon obtaining the response indicating that resource isolation is necessary the resource provision unit 2 generates an isolated file "<R>.err" in response to a resource <R> generation request received from the application execution unit 1. Also, in response to a resource <R> reference request from the application execution unit 1, the resource provision unit 2 provides the isolated file "<R>.err" if the isolated file "<R>.err" exists. However, if the isolated file "<R>.err" does not exist, the resource provision unit 2 provides the normal file "<R>".

System Operations

Next, operations performed in the distributed processing system 20 of the second embodiment will be described with reference to FIGS. 10 to 20. FIG. 9 will be referenced as needed in the following description. Also, in the second embodiment, a distributed processing method is carried out by causing the distributed processing system 20 to operate. Accordingly, the following description of operations performed in the distributed processing system 20 will substitute for a description of a distributed processing method according to the second embodiment.

System Operations>Application Execution Unit>Overall Processing

Figure 10:
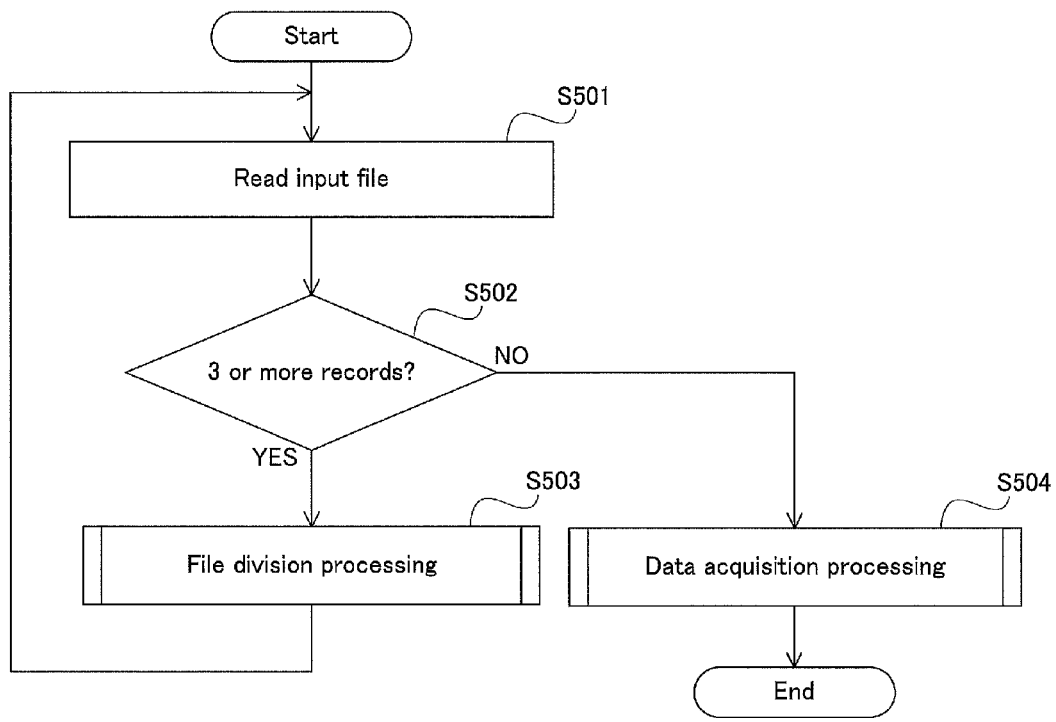
FIG. 10 is a flowchart showing processing steps of an application according to the second embodiment.

First, operations performed by the application execution unit 1, that is to say the processing steps of the application A of the second embodiment, will be described with reference to FIG. 10. FIG. 10 is a flowchart showing processing steps of the application according to the second embodiment.

As shown in FIG. 10, first, the application execution unit 1 reads an input file (step S501).

Next, the application execution unit 1 determines whether the input file has three or more records (step S502). If the result of the determination in step S502 is that the input file has three or more records (YES in step S502), the application execution unit 1 executes file division processing (step S503). The application execution unit 1 then executes step S501 again.

On the other hand, if the result of the determination in step S502 is that the input file does not have three or more records, that is to say, if the input file has two or fewer records (NO in step S502), the application execution unit 1 executes data acquisition processing (step S504). The application execution unit 1 then ends this processing.

System Operations>Application Execution Unit>File Division Processing

Figure 11:
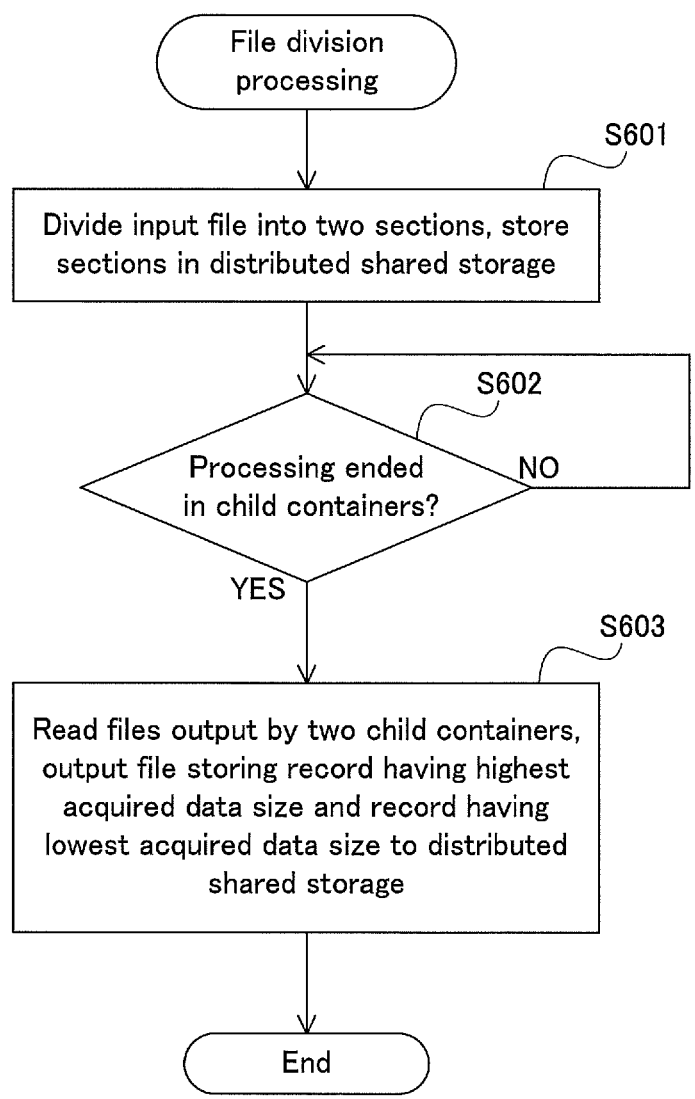
FIG. 11 is a flowchart showing details of file division processing shown in FIG. 10.

Next, details of the file division processing in step S503 shown in FIG. 10 will be described with reference to FIG. 11. FIG. 11 is a flowchart showing details of the file division processing shown in FIG. 10.

As shown in FIG. 11, first, the application execution unit 1 divides the input file into two sections, and stores the sections in the distributed shared storage DS (step S601). Specifically, in step S601, the application execution unit 1 requests the resource provision unit 2 to generate divided files in the distributed shared storage DS, as will be described later.

Next, the application execution unit 1 determines whether processing has ended in the child containers that are in a child relationship (step S602). If the result of the determination in step S602 is that processing has not ended in the child containers that are in a child relationship (NO in step S602), the application execution unit 1 waits until processing has ended in the child containers.

On the other hand, if the result of the determination in step S602 is that processing has ended in the child containers (YES in step S602), the application execution unit 1 reads the files that were output by the two child containers, creates a file that stores the record having the highest acquired data size and the record having the lowest acquired data size, and outputs the created file to the distributed shared storage DS (step S603). The application execution unit 1 then ends the file division processing. Specifically, in step S603 as well, the application execution unit 1 requests the resource provision unit 2 to generate the file in the distributed shared storage DS, as will be described later.

System Operations>Application Execution Unit>Data Acquisition Processing

Figure 12:
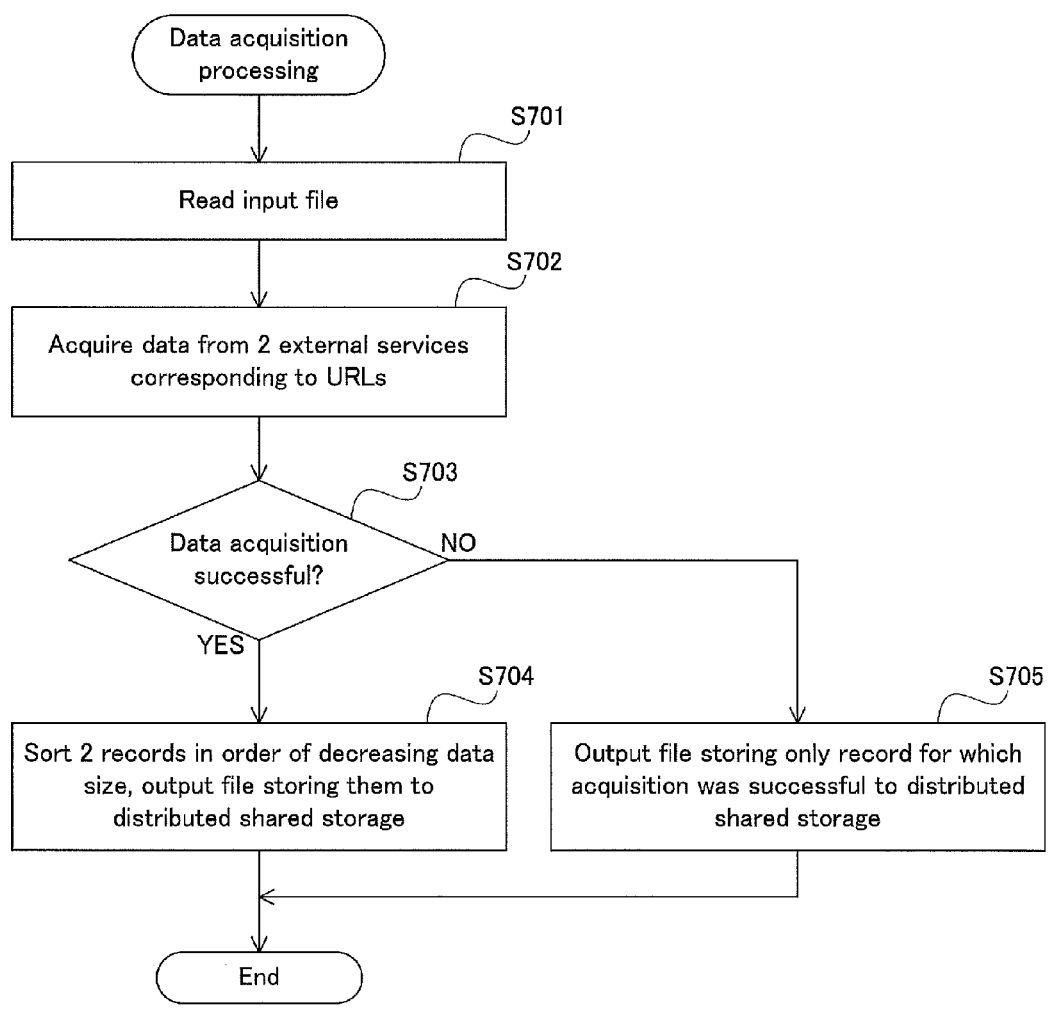
FIG. 12 is a flowchart showing details of data acquisition processing shown in FIG. 10.

Next, details of the data acquisition processing in step S504 shown in FIG. 10 will be described with reference to FIG. 12. FIG. 12 is a flowchart showing details of the data acquisition processing shown in FIG. 10.

As shown in FIG. 12, first, the application execution unit 1 reads the input file (step S701).

Next, the application execution unit 1 acquires data from the external services ES that correspond to the URLs stored in the two records in the input file that was read (step S702).

Next, the application execution unit 1 determines whether data acquisition from the external services ES was successful (step S703). If the result of the determination in step S703 is that data acquisition was successful (YES in step S703), the application execution unit 1 sorts the two records in order of decreasing size of the acquired data, and then outputs the normal file "<R>" storing the two records to the distributed shared storage DS (step S704). The application execution unit 1 then ends the data acquisition processing.

On the other hand, if the result of the determination in step S703 is that data acquisition from the external services ES failed (NO in step S703), the application execution unit 1 outputs to the distributed shared storage DS an isolated file "<R>.err" that stores only the records for which data acquisition from the external service ES was successful (step S705). The application execution unit 1 then ends the data acquisition processing.

Note that more specifically, in steps S704 and 705, the application execution unit 1 requests the resource provision unit 2 to generate the file in the distributed shared storage DS, as will be described later.

System Operations

Figure 13:
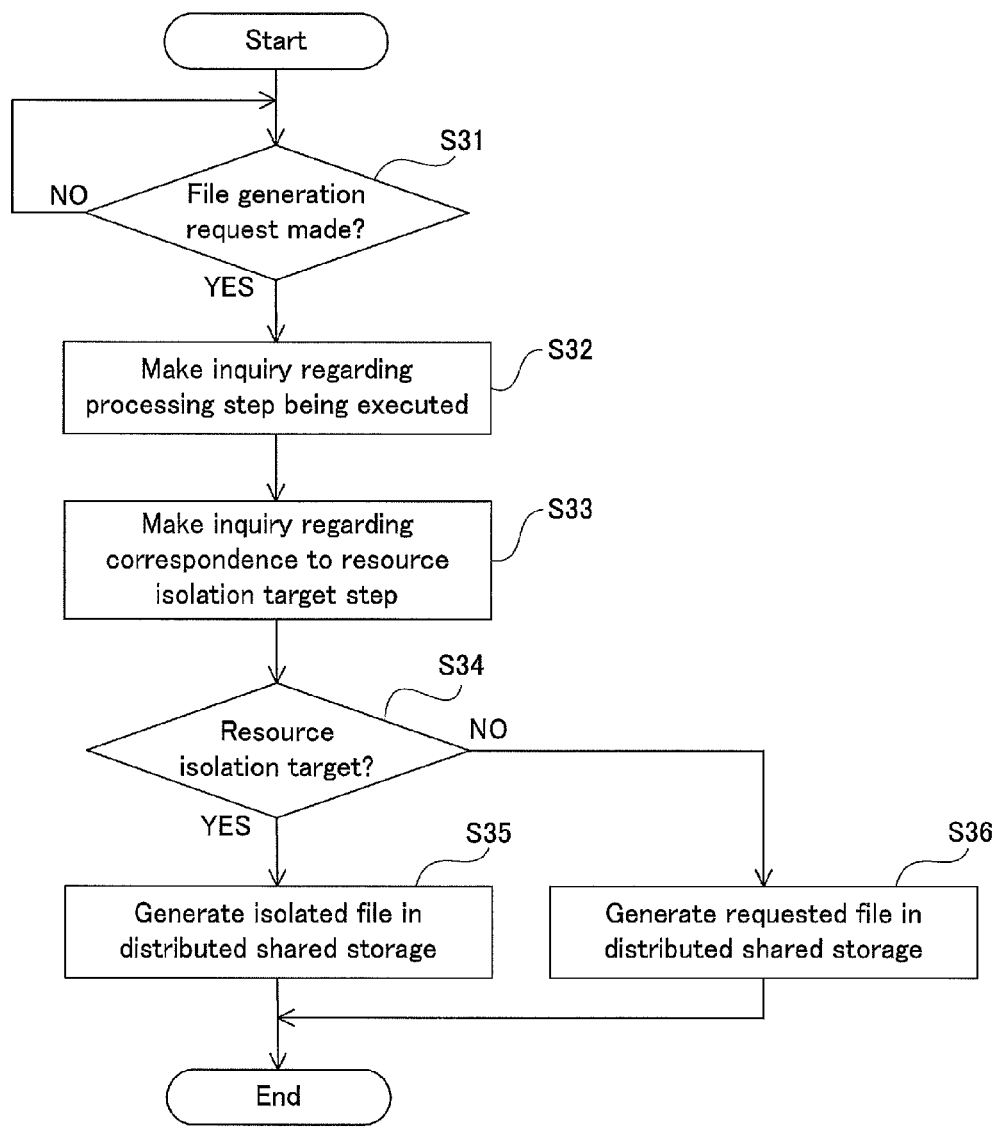
FIG. 13 is a flowchart showing resource provision processing, monitoring processing, and resource isolation determination processing according to the second embodiment.

System Operations>Application Execution Unit, Processing Step Monitoring Unit, Resource Isolation Determination Unit Next, operations performed by the resource provision unit 2, the processing step monitoring unit 3, and the resource isolation determination unit 4 will be described with reference to FIG. 13. FIG. 13 is a flowchart showing resource provision processing, monitoring processing, and resource isolation determination processing according to the second embodiment.

As shown in FIG. 13, first, the resource provision unit 2 determines whether the application execution unit 1 has made a request for file generation in the distributed shared storage DS (step S31). If the result of the determination in step S31 is that file generation has not been requested, the resource provision unit 2 waits for file generation to be requested.

On the other hand, if the result of the determination in step S31 is that file generation has been requested, the resource provision unit 2 makes an inquiry to the processing step monitoring unit 3 regarding the type of the processing step being executed by the application execution unit 1 (step S32). Accordingly, the processing step monitoring unit 3 outputs an inquiry result to the resource provision unit 2.

Next, upon receiving the inquiry result from the processing step monitoring unit 3, the resource provision unit 2 makes an inquiry, based on the inquiry result, to the resource isolation determination unit 4 regarding whether the processing step that is being executed corresponds to a resource isolation target step. The resource isolation determination unit 4 then determines whether the processing step that is being executed corresponds to a resource isolation target step (step S34), and outputs the determination result to the resource provision unit 2.

If the result of the determination in step S34 is that the processing step corresponds to a resource isolation target step, the resource provision unit 2 generates an isolated file in the distributed shared storage DS (step S35). On the other hand, if the result of the determination in step S34 is that the processing step does not correspond to a resource isolation target step, the resource provision unit 2 generates the requested file in the distributed shared storage DS (step S36).

System Operations>Specific Example

The following describes a specific example of operations in the case where the processing target file F in the distributed shared storage DS is the input file, and the application A is executed by the container C_a-1, with reference to FIGS. 14 to 20. FIG. 14 is a diagram showing an example of the data configuration of a processing target file stored in the distributed shared storage according to the second embodiment. FIG. 15 is a diagram showing an example of the result of data acquisition from URLs specified by the processing target file shown in FIG. 14. FIGS. 16 to 20 are diagrams showing an example of various types of files stored in the distributed shared storage according to the second embodiment.

In the following description of operations, the file shown in FIG. 14 is used as the file F in the distributed shared storage DS. Also, FIG. 15 shows the result of data acquisition from the external services ES that correspond to the URLs shown in FIG. 14.

As shown in FIG. 15, the size of the acquired data is stored in the acquisition result field of the processing target file F. If "error" is stored in the acquisition result field, it shows that data acquisition failed. Also, the resource isolation determination unit 4 in each container C sets the processing step "S705" of the application A (see FIG. 10) as a resource isolation target step.

First, the application execution unit 1_a-1 of the container C_a-1 starts the execution of the application A, and reads a file "F_IN" as the input file (step S501).

Next, since there are three or more records, the application execution unit 1_a-1 divides the file "F_IN" and requests the resource provision unit 2_a-1 to generate two files "C_a-1-F" and "C_a-1-S" in the distributed shared storage DS (step S601).

Next, the resource provision unit 2_a-1 makes inquiries to the processing step monitoring unit 3_a-1 and the resource isolation determination unit 4_a-1, and determines, based on the obtained inquiry results, whether the current processing step is a processing step that does not require resource isolation.

Figure 16:
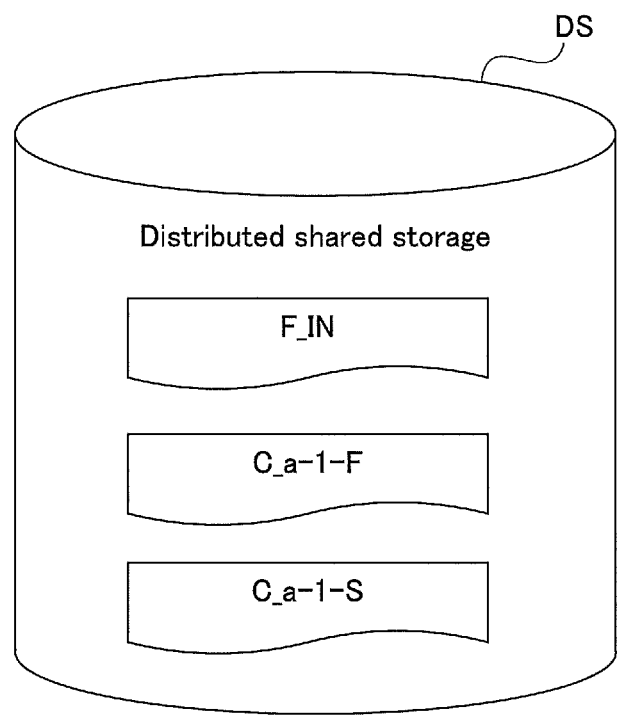
FIG. 16 is a diagram showing an example of various types of files stored in the distributed shared storage according to the second embodiment.

Accordingly, as shown in FIG. 16, the resource provision unit 2_a-1 generates the two files "C_a-1-F" and "C_a-1-S" in the distributed shared storage DS (step S601).

Next, the application execution unit 1_b-1 of the container C_b-1 starts the execution of the application A, and reads the file "C_a-1-F" as the input file (step S501). In parallel with this, the application execution unit 1_b-2 of the container C_b-2 starts the execution of the application A, and reads the file "C_a-1-S" as the input file (step S501).

Figure 17:
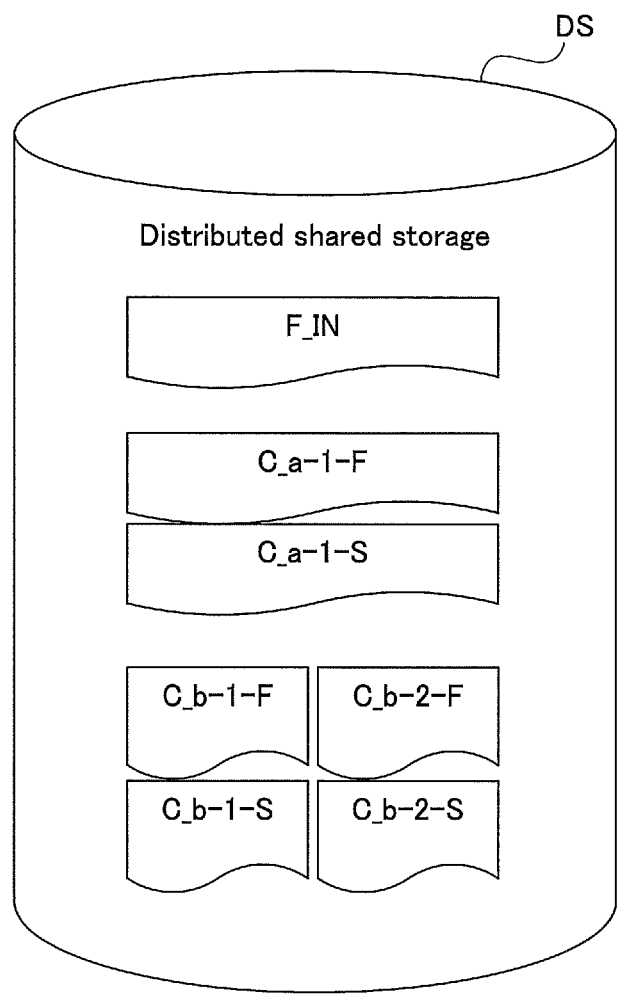
FIG. 17 is a diagram showing an example of various types of files stored in the distributed shared storage according to the second embodiment.

Since there are three or more records in both of the files, the container C_b-1 and the container C_b-2 execute file division processing similar to the above-described file division processing executed by the container C_a-1. As a result, as shown in FIG. 17, four new files "C_b-1-F", "C_b-1-S", "C_b-2-F", and "C_b-2-S" are generated in the distributed shared storage DS (step S601).

Next, the application execution unit 1_c-1 of the container C_c-1 starts the execution of the application A, and reads the file "C_b-1-F" as the input file (step S501). In parallel with this, the application execution unit 1_c-2 of the container C_c-2 starts the execution of the application A, and reads the file "C_b-1-S" as the input file (step S501).

Similarly, the container C_c-3 starts the execution of the application A using the file "C_b-2-F" as the input file (step S501), and the container C_c-4 starts the execution of the application A using the file "C_b-2-S" as the input file (step S501).

Next, the container C_c-1 performs data acquisition processing since there are two records. Specifically, the URL "http://example.com/data/WEST/OSAKA" and the URL "http://example.com/data/WEST/FUKUOKA" are accessed, and "100" and "200" are obtained as the acquisition results (step S702).

Next, the container C_c-1 requests the resource provision unit 2_c-1 to generate an output file "C_b-1-F-out" (step S704).

Next, the resource provision unit 2_c-1 makes inquiries to the processing step monitoring unit 3_c-1 and the resource isolation determination unit 4_c-1, and determines, based on the obtained inquiry results, whether the current processing step is a processing step that does not require resource isolation.

Figure 18:
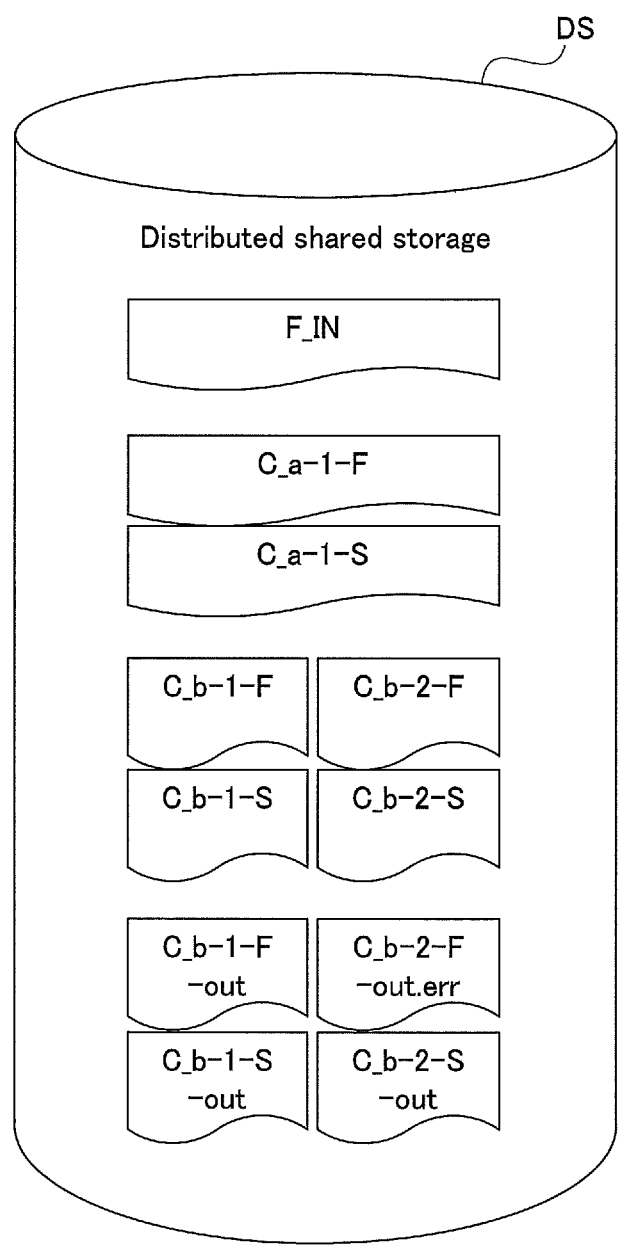
FIG. 18 is a diagram showing an example of various types of files stored in the distributed shared storage according to the second embodiment.

Accordingly, as shown in FIG. 18, the resource provision unit 2_c-1 generates the new output file "C_b-1-F-out" in the distributed shared storage DS (step S704). Regarding the content of the output file "C_b-1-F-out", the first record is (http://example.com/data/WEST/FUKUOKA,200) and the second record is (http://example.com/data/WEST/OSAKA, 100).

Similarly, as shown in FIG. 18, the resource provision unit 2_c-2 of the container C_c-2 generates a new output file "C_b-1-S-out" in the distributed shared storage DS (step S704). Regarding the content of the output file "C_b-1-S-out", the first record is (http://example.com/data/WEST/KOBE,10), and the second record is (http://example.com/data/WEST/KYOTO,5).

Similarly, as shown in FIG. 18, the resource provision unit 2_c-4 of the container C_c-4 generates a new output file "C_b-2-S-out" in the distributed shared storage DS (step S704). Regarding the content of the output file "C_b-2-S-out", the first record is (http://example.com/data/EAST/SAPPORO,90), and the second record is (http://example.com/data/EAST/SENDAI,80).

On the other hand, the application execution unit 1_c-3 of the container C_c-3 fails to access the URL "http://example.com/data/EAST/TOKYO" (NO in step S703). For this reason, the procedure moves to the processing step of step S705.

Next, the application execution unit 1_c-3 of the container C_c-3 requests the resource provision unit 2_c-3 to generate an output file "C_b-2-F-out" in the distributed shared storage DS (step S705).

Next, the resource provision unit 2_c-3 makes inquiries to the processing step monitoring unit 3_c-3 and the resource isolation determination unit 4_c-3, and determines, based on the obtained inquiry results, whether the current processing step is a processing step that requires resource isolation.

Accordingly, as shown in FIG. 18, the resource provision unit 2_c-3 generates a new isolated file "C_b-2-F-out.err" in the distributed shared storage DS (step S705). Regarding the content of the isolated file "C_b-2-F-out.err", only the one record (http://example.com/data/EAST/YOKOHAMA,150) exists.

Next, when processing ends in the two child containers C_c-1 and C_c-2, the application execution unit 1_b-1 of the container C_b-1 requests the resource provision unit 2_b-1 to reference the files "C_b-1-F-out" and "C_b-1-S-out" that were output by the child containers (step S603).

Next, the resource provision unit 2_b-1 makes inquiries to the processing step monitoring unit 3_b-1 and the resource isolation determination unit 4_b-1, and determines, based on the inquiry results, whether the current processing step is a processing step that does not require resource isolation.

Figure 19:
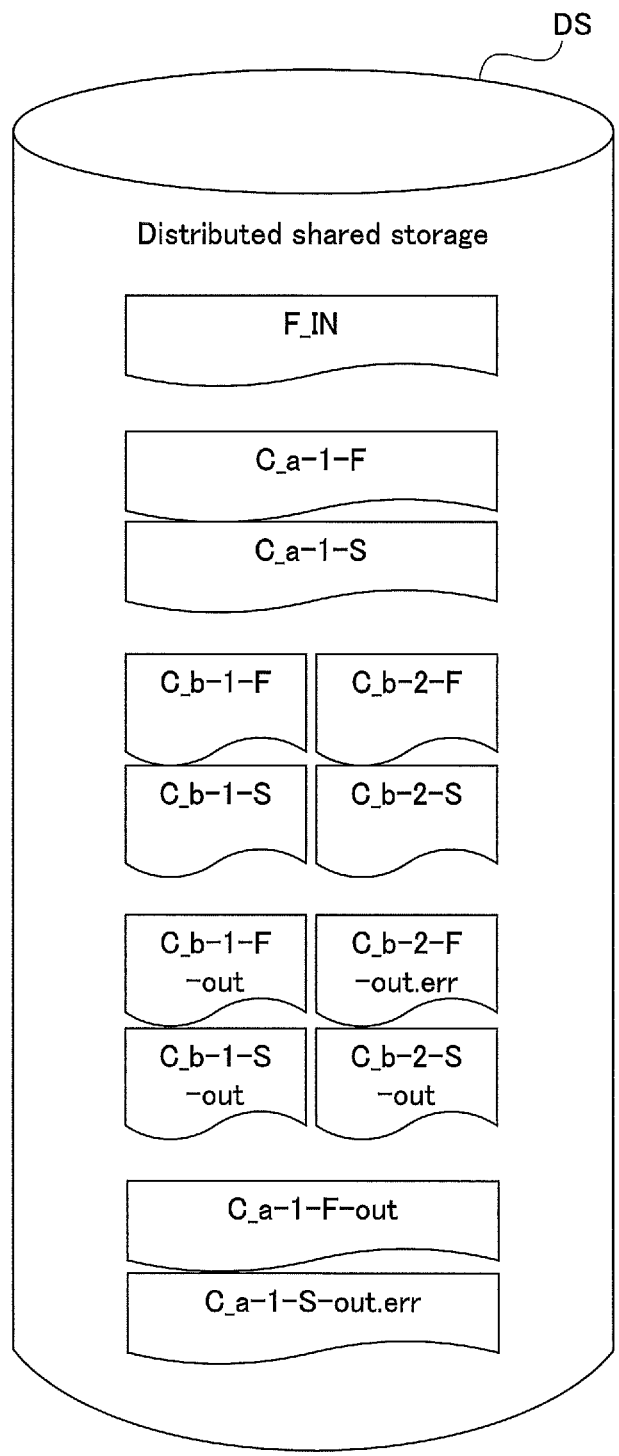
FIG. 19 is a diagram showing an example of various types of files stored in the distributed shared storage according to the second embodiment.

As shown in FIG. 19, the resource provision unit 2_b-1 then generates a new output file "C_a-1-F-out" with reference to the two files "C_b-1-F-out" and "C_b-1-S-out", and outputs the new output file to the distributed shared storage DS (step S603). Regarding the content of the output file "C_a-1-F-out", the first record is (http://example.com/data/WEST/FUKUOKA,200), and the second record is (http://example.com/data/WEST/KYOTO,5).

Also, when processing ends in the two child containers C_c-3 and C_c-4, the application execution unit 1_b-2 of the container C_b-2 requests the resource provision unit 2_b-2 to reference the files "C_b-2-F-out" and "C_b-2-S-out" that were output by the child containers (step S603).

Note that in this case, the resource provision unit 2_b-2 makes an execution history inquiry to the processing step monitoring unit 3_b-2. In response to the inquiry, the processing step monitoring unit 3_b-2 sends a response result that includes the step S705 execution history that is recorded in the processing step monitoring unit 3_c-3. The resource provision unit 2_b-2 makes an inquiry to the resource isolation determination unit 4_b-2 using the response result, and determines whether the current processing step is a processing step that requires resource isolation.

As shown in FIG. 19, the resource provision unit 2_b-2 then generates a new isolated file "C_a-1-S-out.err" with reference to the two files "C_b-2-F-out.err" and "C_b-2-S-out", and outputs the new isolated file to the distributed shared storage DS (step S603). Regarding the content of the isolated file "C_a-1-S-out.err", the first record is (http://example.com/data/EAST/YOKOHAMA,150), and the second record is (http://example.com/data/EAST/SENDAI,80).

Next, when processing ends in the two child containers C_b-1 and C_b-2, the application execution unit 1_a-1 of the container C_a-1 requests the resource provision unit 2_a-1 to reference the files "C_a-1-F-out" and "C_a-1-S-out" that were output by the child containers (step S603).

In this case as well, similarly to the above-described determination made by the resource provision unit 2_b-2, the resource provision unit 2_a-1 determines whether the current processing step is a processing step that requires resource isolation.

Figure 20:
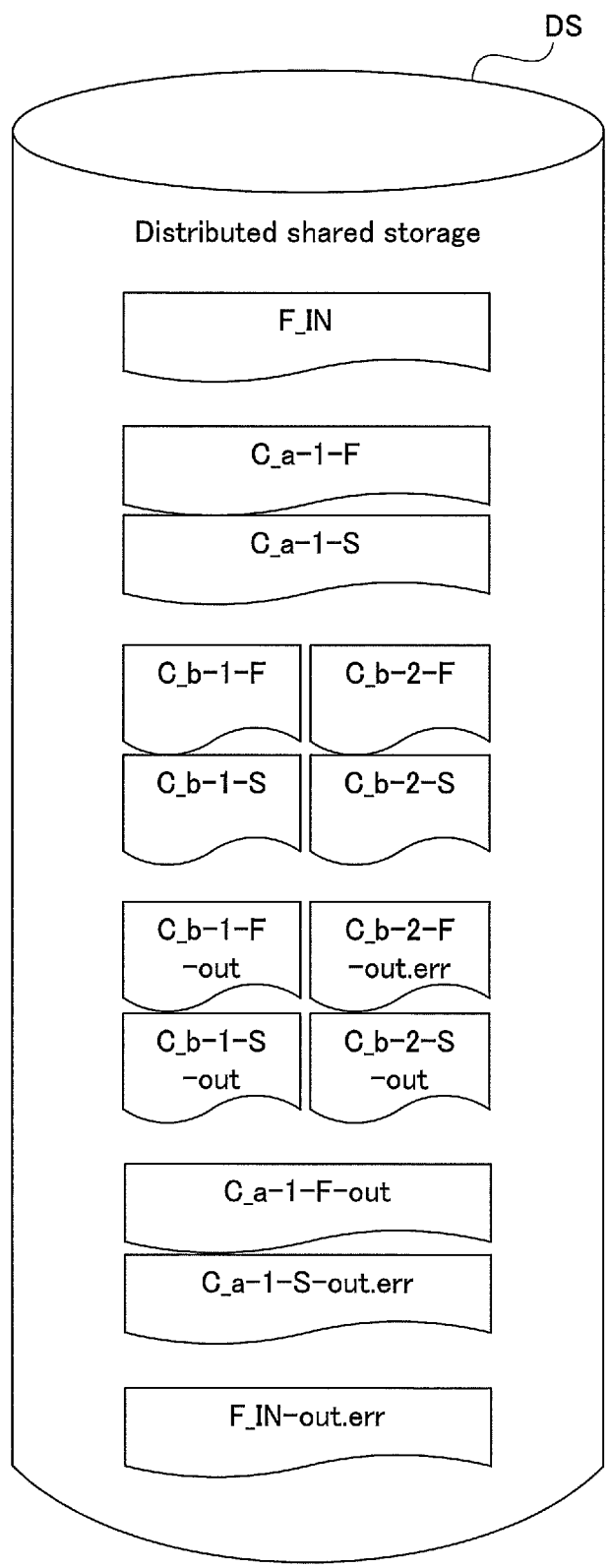
FIG. 20 is a diagram showing an example of various types of files stored in the distributed shared storage according to the second embodiment.

Accordingly, as shown in FIG. 20, the resource provision unit 2_a-1 generates a new isolated file "F_IN-out.err" with reference to the two files "C_a-1-F-out" and "C_a-1-S-out.err", and outputs the new isolated file to the distributed shared storage DS (step S603). Regarding the content of the isolated file "F_IN-out.err", the first record is (http://example.com/data/WEST/FUKUOKA,200), and the second record is (http://example.com/data/WEST/KYOTO,5).

As described above, in the distributed processing system of the second embodiment, if the processing step is a resource isolation step, an isolated file "<R>.err" that stores the result of that processing is output to the distributed shared storage DS.

Accordingly, in the second embodiment as well, the system administrator can easily become aware of the fact that a resource isolation step was executed by checking for the existence of the isolated file. This makes it possible to facilitate the tasks of analysis and response when an error or an obstacle has occurred.

Also, since the isolated file that was influenced by an error or an obstacle and the normal file that was not influenced by the error or the obstacle are held separately, recovery can be performed without executing the entirety of the application again. A specific description of this will be given below.

In the second embodiment described above, the three isolated files "C_b-2-F-out.err", "C_a-1-S-out.err", and "F_IN-out.err" are generated.

First, the data size of "http://example.com/data/EAST/TOKYO", which was the reason for the generation of the isolated file "C_b-2-F-out.err" positioned at the lowest level among the three isolated files, is acquired.

Next, the content of the acquired data and the content of the isolated file "C_b-2-F-out.err" are compared with the content of the isolated file "C_a-1-S-out.err" positioned one level higher, and the content of the normal file "C_a-1-S-out" is generated.

Similarly, the content of the generated file "C_a-1-S-out" is compared with the content of the isolated file "F_IN-out.err" positioned one level higher, and the content of the normal file "F_IN-out" is generated. Accordingly, the content of "F_IN-out" can be recovered without executing the entirety of the application again.

Note that the second embodiment describes the case where the processing step monitoring units 3_<x>-<y> that reference processing step execution histories are defined by a tree structure that constructs parent-child relationships. However, the present invention is not limited to the example where the dependency relationships are constructed by a tree structure. The processing step monitoring units 3_<x>-<y> may be in dependence relationships defined by any directed acyclic graph, and similar effects can be obtained in such a case as well.

Distributed Processing Program

Also, the program in the second embodiment needs only be a program for causing computers that configure nodes that include containers to execute steps S31 to S36 shown in FIG. 13. The resource provision unit 2, the processing step monitoring unit 3, and the resource isolation determination unit 4 can be constructed by installing this program in the computers and executing it. In this case, the CPUs of the computers function and perform processing as the resource provision unit 2, the processing step monitoring unit 3, and the resource isolation determination unit 4. In the second embodiment as well, the nodes may be physical nodes or virtual nodes.

Also, the embodiments described above are merely examples, and are not intended to exclude various modifications and technical applications that are not disclosed in the embodiments. In other words, the present invention can be carried out in various modified forms without departing from the spirit of the invention.

Figure 21:
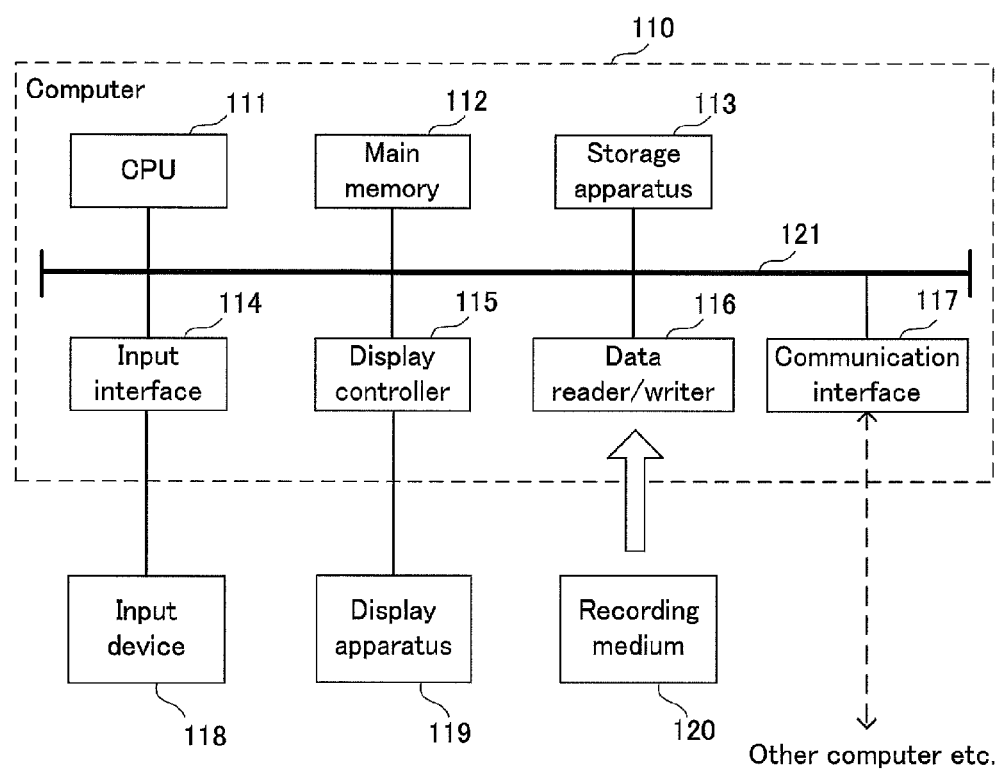
FIG. 21 is a block diagram showing an example of a computer for realizing nodes according to the first embodiment and the second embodiment.

A computer that can realize the various nodes by executing the programs of the first embodiment and the second embodiment will be described below with reference to FIG. 21. FIG. 21 is a block diagram showing an example of a computer for realizing nodes according to the first embodiment and the second embodiment.

As shown in FIG. 21, a computer 110 includes a CPU 111, a main memory 112, a storage apparatus 113, an input interface 114, a display controller 115, a data reader/writer 116, and a communication interface 117. These units are connected via a bus 121 so as to be able to perform data communication with each other.

The CPU 111 deploys the program (code) of the first embodiment or the second embodiment, which is stored in the storage apparatus 113, to the main memory 112, and carries out various types of operations by executing instructions of the program in a predetermined sequence. The main memory 112 is typically a volatile storage apparatus such as a DRAM (Dynamic Random Access Memory).

The programs of the first embodiment and the second embodiment can also be provided in the state of being recorded on a computer-readable recording medium 120. Note that the programs of the first embodiment and the second embodiment may be distributed over the Internet through a connection via the communication interface 117.

Specific examples of the storage apparatus 113 include a hard disk drive and a semiconductor storage apparatus such as a flash memory. The input interface 114 mediates data transmission between the CPU 111 and input devices 118 such as a keyboard and a mouse. The display controller 115 is connected to a display apparatus 119 and controls display performed by the display apparatus 119.

The data reader/writer 116 mediates data transmission between the CPU 111 and the recording medium 120, that is to say, reads out the program from the recording medium 120, and writes processing results obtained by the computer 110 to the recording medium 120. The communication interface 117 mediates data transmission between the CPU 111 and other computers.

Specific examples of the recording medium 120 include a general semiconductor storage device such as a CF (Compact Flash (registered trademark)) card or an SD (Secure Digital) card, a magnetic storage medium such as a flexible disk, and an optical storage medium such as a CD-ROM (Compact Disk Read Only Memory).

Part or all of the above-described embodiment can be realized by Supplementary Notes 1 to 15 below, but there is no limitation to the following description.

Supplementary Note 1

A distributed processing system comprising:

a plurality of application execution units that perform distributed execution of one application while referencing a processing target file in a distributed shared storage;

a processing step monitoring unit that monitors a processing step of the application that is being executed by the application execution units;

a resource isolation determination unit that determines whether the processing step being monitored by the processing step monitoring unit is a resource isolation step that requires resource isolation; and a resource provision unit that, if the resource isolation determination unit determined that the processing step is the resource isolation step, generates an isolated file that corresponds to the processing target file.

Supplementary Note 2

The distributed processing system according to Supplementary Note 1, wherein if the resource isolation determination unit determined that the processing step is not the resource isolation step, the resource provision unit provides the application with a processing target file in the distributed shared storage, and if the resource isolation determination unit determined that the processing step is the resource isolation step, the resource provision unit generates the isolated file in a node that executes the processing step, duplicates content of the processing target file in the isolated file, and provides the application with the isolated file.

Supplementary Note 3

The distributed processing system according to Supplementary Note 2, wherein the application execution unit and the resource provision unit are provided in each node, and for each resource provision unit, if the resource isolation determination unit determined that the processing step executed by the application execution unit in the node that includes the resource provision unit is the resource isolation step, the resource provision unit included in the node generates the isolated file in the node.

Supplementary Note 4

The distributed processing system according to Supplementary Note 1, wherein if the resource isolation determination unit determined that the processing step is not the resource isolation step, the resource provision unit generates an output file that stores a result of execution of the processing step, and outputs the output file to the distributed shared storage, and if the resource isolation determination unit determined that the processing step is the resource isolation step, the resource provision unit generates the isolated file that stores a result of execution of the processing step, and outputs the isolated file to the distributed shared storage.

Supplementary Note 5

A distributed processing method comprising:

(a) a processing step monitoring step of, if a plurality of nodes are performing distributed execution of one application while referencing a processing target file in a distributed shared storage, monitoring a processing step of the application that is being executed;

(b) a resource isolation determination step of determining whether the processing step being monitored in the processing step monitoring step is a resource isolation step that requires resource isolation; and (c) a resource provision step of, if it was determined in the resource isolation determination step that the processing step is the resource isolation step, generating an isolated file that corresponds to the processing target file.

Supplementary Note 6

The distributed processing method according to Supplementary Note 5, wherein in step (c), if it was determined in the resource isolation determination step that the processing step is not the resource isolation step, the application is provided with the processing target file in the distributed shared storage, and in step (c), if it was determined in the resource isolation determination step that the processing step is the resource isolation step, the isolated file is generated in a node that executes the processing step, content of the processing target file is duplicated in the isolated file, and the application is provided with the isolated file.

Supplementary Note 7

The distributed processing method according to Supplementary Note 6, wherein step (c) is executed in each node, and in step (c) of each node, if it was determined in the resource isolation determination step that the processing step executed by the node that is executing step (c) is the resource isolation step, the isolated file is generated in the node.

Supplementary Note 8

The distributed processing method according to Supplementary Note 5, wherein in step (c), if it was determined in the resource isolation determination step that the processing step is not the resource isolation step, an output file that stores a result of execution of the processing step is generated and output to the distributed shared storage, and in step (c), if it was determined in the resource isolation determination step that the processing step is the resource isolation step, the isolated file that stores a result of execution of the processing step is generated and output to the distributed shared storage.

Supplementary Note 9

A computer-readable recording medium having recorded thereon a program containing instructions for causing a computer to execute:

(a) a processing step monitoring step of, if a plurality of nodes are performing distributed execution of one application while referencing a processing target file in a distributed shared storage, monitoring a processing step of the application that is being executed;

(b) a resource isolation determination step of determining whether the processing step being monitored in the processing step monitoring step is a resource isolation step that requires resource isolation; and (c) a resource provision step of, if it was determined in the resource isolation determination step that the processing step is the resource isolation step, generating an isolated file that corresponds to the processing target file.

Supplementary Note 10

A computer-readable recording medium having recorded thereon a program containing instructions for causing a computer to execute:

a step of, in a case where a plurality of nodes are performing distributed execution of one application while referencing a processing target file in a distributed shared storage, generating an isolated file that corresponds to the processing target file if a processing step of the application that is being executed corresponds to a resource isolation step that requires resource isolation.

Supplementary Note 11

A computer-readable recording medium having recorded thereon a program containing instructions for causing a computer to execute:

(a) a processing step monitoring step of, if a plurality of nodes are performing distributed execution of one application while referencing a processing target file in a distributed shared storage, monitoring a processing step of the application that is being executed; and (b) a resource isolation determination step of determining whether the processing step being monitored in the processing step monitoring step is a resource isolation step that requires resource isolation.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A distributed processing system comprising:
   one or more memory devices that store a set of instructions; and
   one or more processors configured to execute the set of instructions to:
      perform distributed execution of an application associated with a processing target file in a distributed shared storage;
      monitor processing steps of the application during the distributed execution;
      determine whether a monitored processing step satisfies a pre-determined condition;
      responsive to determining that the monitored processing step satisfies the pre-determined condition:
         generate a second file that corresponds to the processing target file, the second file being separate from the processing target file, and
         provide the second file to the application;
      responsive to determining that the monitored processing step does not satisfy the pre-determined condition, provide the processing target file to the application.

2. The distributed processing system according to claim 1, further comprising:
   a first node of a plurality of nodes participating in the distributed execution, the first node comprising at least some of the one or more memory devices and the one or more processors, such that the first node performs at least the processing;
   wherein, to generate the second file, the one or more processors of the first node are further configured to execute the set of instructions to:
      duplicate content of the processing target file in the second file,
      generate, based on the duplicate content, the second file at the first node, and
      provide the second file to the application.

3. The distributed processing system according to claim 2, wherein each node of the plurality of nodes comprises at least some of the one or more memories and the one or more processors, such that each node of the plurality of nodes performs at least the processing, and
   the one or more processors of each node are configured to generate the second file at each node of the plurality of nodes.

4. The distributed processing system according to claim 1, wherein the one or more processors are further configured to execute the set of instructions to:
   responsive to determining that the monitored processing step does not satisfy the pre-determined condition:
      generate an output file that stores a result of execution of the monitored processing step, and
      output the output file to the distributed shared storage; and
   responsive to determining that the monitored processing step satisfies the pre-determined condition, output the second file to the distributed shared storage, wherein the second file stores a result of execution of the monitored processing step.

5. The distributed processing system according to claim 1, wherein the one or more processors are capable of executing the set of instructions to:
   receive an input file that includes information for executing the application to perform one or more tasks;
   wherein the second file is generated when the processing step of the application that satisfies the pre-determined condition is executed based on the information included in the input file.

6. The distributed processing system of claim 5, wherein the one or more tasks include acquisition of data from a source; wherein the input file includes information about the source; and wherein the monitored processing step of the application that satisfies the pre-determined condition is executed based on a status of acquisition of the data from the source.

7. The distributed processing system of claim 6, wherein the plurality of nodes further comprises a second node, wherein the second node comprises some of the one or more memory devices and the one or more processors; wherein the processing steps of the application are also executed by a second node; wherein the one or more processors of the second node are capable of executing the set of instructions to:
   divide the input file into a third file and a fourth file;
   provide the third file to the first node; and
   provide the fourth file to the second node.

8. A distributed processing method implemented by one or more processors, the method comprising:
- monitoring, by one of the one or more processors, processing steps of an application during a distributed execution of the application, wherein the application is associated with a processing target file in a distributed shared storage;
- determining, by one of the one or more processors, whether a monitored processing step satisfies a pre-determined condition;
- responsive to determining that the monitored processing step satisfies the pre-determined condition:
  - generating, by one of the one or more processors, a second file that corresponds to the processing target file, and
  - providing, by one of the one or more processors, the second file to the application;
- responsive to determining that the monitored processing step does not satisfy the pre-determined condition, providing, by one of the one or more processors, the processing target file to the application.

9. The distributed processing method according to claim 8, wherein the monitoring of processing steps of the application during a distributed execution of the application comprises monitoring processing steps of the application being executed at a node of a plurality of nodes participating in the distributed execution;
- wherein the generation of a second file that corresponds to the processing target file and the providing of the second file to the application comprise:
  - duplicating, by one of the one or more processors, content of the processing target file in the second file;
  - generating, by one of the one or more processors, the second file at the node; and
  - providing, by one of the one or more processors, the second file to the application.

10. The distributed processing method according to claim 9, wherein the generation of a second file that corresponds to the processing target file comprises causing, by one of the one or more processors, the node to generate the second file at the node.

11. The distributed processing method according to claim 8, further comprising:
- responsive to determining that the monitored processing step does not satisfy the pre-determined condition:
  - generating, by one of the one or more processors, an output file that stores a result of execution of the monitored processing step, and
  - outputting, by one of the one or more processors, the output file to the distributed shared storage;
- responsive to determining that the monitored processing step satisfies the pre-determined condition:
  - outputting, by one of the one or more processors, the second file to the distributed shared storage, wherein the second file stores a result of execution of the monitored processing step.

12. The distributed processing method according to claim 8, further comprising receiving an input file that include information for executing the application to perform one or more tasks, wherein the second file is generated when the monitored processing step of the application that satisfies the pre-determined condition is executed based on the information included in the input file.

13. The distributed processing method according to claim 12, wherein the one or more tasks include acquisition of data from a source; wherein the input file includes information about the source; and wherein the monitored processing step of the application that satisfies the pre-determined condition is executed based on a status of acquisition of the data from the source.

14. A non-transitory computer-readable storage medium having stored thereon a program containing instructions that, when executed by a computer, cause the computer to execute a distributed processing method, the method comprising:
- monitoring processing steps of an application during a distributed execution of the application, wherein the application is associated with a processing target file in a distributed shared storage;
- determining whether a monitored processing step satisfy a pre-determined condition;
- responsive to determining that the monitored processing step satisfies the pre-determined condition:
  - generating, by one of the one or more processors, a second file that corresponds to the processing target file, the second file being separate from the processing target file, and
  - providing, by one of the one or more processors, the second file to the application;
- responsive to determining that the monitored processing step does not satisfy the pre-determined condition, providing the processing target file to the application.

15. The non-transitory computer-readable storage medium of claim 14, wherein the monitoring of processing steps of the application during a distributed execution of the application comprises monitoring processing steps of the application being executed at a first node of a plurality of nodes participating in the distributed execution, such that the first node performs at least the processing;
- wherein the generation of a second file that corresponds to the processing target file and the providing of the second file to the application comprise:
  - duplicating content of the processing target file in the second file;
  - generating the second file at the first node; and
  - providing the second file to the application.

16. The non-transitory computer-readable storage medium of claim 15, wherein the generation of the second file that corresponds to the processing target file comprises causing the first node to generate the second file at the first node.

17. The non-transitory computer-readable storage medium of claim 14, wherein the method further comprises:
- responsive to determining that the monitored processing step does not satisfy the pre-determined condition:
  - generating an output file that stores a result of execution of the monitored processing step, and
  - outputting the output file to the distributed shared storage;
- responsive to determining that the monitored processing step satisfies the pre-determined condition:
  - outputting the second file to the distributed shared storage, wherein the second file stores a result of execution of the monitored processing step.

18. The non-transitory computer-readable storage medium according to claim 14, wherein the method further comprises:
- receiving an input file that includes information for executing the application to perform one or more tasks;
- wherein the second file is generated when the monitored processing step of the application that satisfies the pre-determined condition is executed based on the information included in the input file.

19. The non-transitory computer-readable storage according to claim 18, wherein the one or more tasks include acquisition of data from a source; wherein the input file includes information about the source; and wherein the monitored processing step of the application that satisfies the pre-determined condition is executed based on a status of acquisition of the data from the source.

20. The non-transitory computer-readable storage according to claim 18, wherein the processing steps of the application are also executed by a second node of the plurality of nodes; wherein the method further comprises:
dividing the input file into a third file and a fourth file;
providing the third file to the first node; and
providing the fourth file to the second node.

* * * * *